(12) United States Patent
Lim

(10) Patent No.: US 7,609,331 B2
(45) Date of Patent: Oct. 27, 2009

(54) METHOD OF MANUFACTURING ARRAY SUBSTRATE FOR LIQUID CRYSTAL DISPLAY DEVICE

(75) Inventor: Byoung-Ho Lim, Gumi-si (KR)

(73) Assignee: LG Display Co., Ltd., Seoul (KR)

( * ) Notice: Subject to any disclaimer, the term of this patent is extended or adjusted under 35 U.S.C. 154(b) by 281 days.

(21) Appl. No.: 11/643,977

(22) Filed: Dec. 22, 2006

(65) Prior Publication Data
US 2007/0132903 A1   Jun. 14, 2007

Related U.S. Application Data

(62) Division of application No. 10/412,321, filed on Apr. 14, 2003, now Pat. No. 7,199,846.

(30) Foreign Application Priority Data

Apr. 16, 2002   (KR) ............... 2002-20724

(51) Int. Cl.
*G02F 1/136*   (2006.01)
*G02F 1/1333*   (2006.01)
(52) U.S. Cl. ........................ 349/43; 349/138
(58) Field of Classification Search ............. 349/42–43, 349/138; 257/57, 72
See application file for complete search history.

(56) References Cited

U.S. PATENT DOCUMENTS

| | | | |
|---|---|---|---|
| 6,284,558 B1* | 9/2001 | Sakamoto | 438/30 |
| 6,466,279 B1* | 10/2002 | Nakata | 349/42 |
| 6,730,970 B1 | 5/2004 | Katch et al. | |
| 7,012,656 B2* | 3/2006 | Murade | 349/43 |
| 7,274,420 B2* | 9/2007 | You | 349/114 |
| 2002/0033907 A1 | 3/2002 | Oke et al. | |

FOREIGN PATENT DOCUMENTS

CN   1099148 A   2/1995

(Continued)

OTHER PUBLICATIONS

C.W. Kim et al.; "A novel Four-Mask-Count Process Architecture for TFT-LCDs"; SID 00 (2000) Digest; pp. 1006-1009.

*Primary Examiner*—Dung T. Nguyen
(74) *Attorney, Agent, or Firm*—McKenna Long & Aldridge LLP

(57) ABSTRACT

A method of manufacturing an array substrate for a liquid crystal display device includes the steps of forming a gate line, a gate pad and a gate electrode on a substrate, forming a gate insulating layer on the gate line, the gate electrode and the gate pad, forming an active layer on the gate insulating layer, forming an ohmic contact layer on the active layer, forming a data line, a data pad, and source and drain electrodes on the ohmic contact layer, forming a pixel electrode on the source and drain electrodes, the pixel electrode contacting the drain electrode, forming a first passivation layer on the substrate including the pixel electrode, forming a second passivation layer on the first passivation layer, the second passivation layer exposing the first passivation layer over the gate pad and the data pad, and patterning the first passivation layer exposed by the second passivation layer to expose the gate pad and the data pad.

23 Claims, 27 Drawing Sheets

FOREIGN PATENT DOCUMENTS

| | | |
|---|---|---|
| JP | 2000-002886 | 1/2000 |
| JP | 2001-257350 | 9/2001 |
| JP | 2002-057338 | 2/2002 |
| JP | 2002-090779 | 3/2002 |
| KR | 10-2002-0014994 | 3/2002 |

* cited by examiner

METHOD OF MANUFACTURING ARRAY SUBSTRATE FOR LIQUID CRYSTAL DISPLAY DEVICE

This Application is a Divisional of U.S. patent application Ser. No. 10/412,321, filed Apr. 14, 2003 now U.S. Pat. No. 7,199,846, which is hereby incorporated by reference.

This application claims the benefit of Korean Patent Application No. 2002-20724, filed on Apr. 16, 2002 in Korea, which is hereby incorporated by reference for all purposes as if fully set forth herein.

BACKGROUND OF THE INVENTION

1. Field of the Invention

The present invention relates to a liquid crystal display (LCD) device and more particularly, to a method of manufacturing an array substrate for the liquid crystal display device.

2. Discussion of the Related Art

In general, a liquid crystal display (LCD) device includes two substrates, which are spaced apart and facing each other, and a liquid crystal layer interposed between the two substrates. Each of the substrates includes an electrode, and the electrodes of each substrate are also facing each other. Voltage is applied to each electrode, and thus an electric field is induced between the electrodes. Alignment of the liquid crystal molecules is changed by the varying intensity or direction of the electric field. The LCD device displays a picture by varying transmissivity of the light varying according to the arrangement of the liquid crystal molecules.

A conventional LCD device will be described hereinafter more in detail with reference to figures.

FIG. 1 is an exploded perspective view illustrating a conventional LCD device. The conventional LCD device 1 has upper and lower substrates 5 and 22, which are spaced apart from and facing each other, and also has liquid crystal 15 interposed between the upper substrate 5 and the lower substrate 22.

The upper substrate 5 includes a black matrix 6, a color filter layer 7, and a common electrode 9 subsequently on the inside (i.e., the side facing the lower substrate 22). The black matrix 6 has an opening. The color filter layer 7 corresponds to openings in the black matrix 6 and includes three sub-color filters of red (R), green (G), and blue (B). The common electrode 9 is formed on the color filter 7 and is transparent.

At least one gate line 12 and at least one data line 34 are formed on the inner surface of the lower substrate 22 (i.e., the side facing the upper substrate 5). The gate line 12 and the date line 34 cross each other to define a pixel area P. A thin film transistor T, as a switching element, is formed at the crossing of the gate line 12 and the data line 34. The thin film transistor T includes a gate electrode, a source electrode and a drain electrode. A plurality of such thin film transistors is arranged in a matrix from to correspond to other crossings of gate and data lines. A pixel electrode 56, which is connected to the thin film transistor T, is formed in the pixel area P. The pixel electrode 56 corresponds to the sub-color filter, and is made of a transparent conductive material such as indium-tin-oxide (ITO) that transmits light relatively well. The lower substrate 22, which includes the thin film transistors T and the pixel electrodes 56 arranged in the matrix form, may be commonly referred to as an array substrate.

In operation, a scanning pulse is applied to the gate electrode of the thin film transistor T through the gate line 12 and a data signal is applied to the source electrode of the thin film transistor T through the data line 34.

The LCD device is driven due to electrical and optical effects of the liquid crystal. The liquid crystal is dielectric anisotropic material having a property of spontaneous polarization. When a voltage is applied, the liquid crystal forms a dipole by the spontaneous polarization, and thus molecules of the liquid crystal are arranged by an electric field. Optical modulation occurs from the optical properties of the liquid crystal, which vary according to the arrangement of the liquid crystal. Images of the LCD device are produced by controlling transmittance of the light due to the optical modulation.

FIG. 2 illustrates a plan view of an array substrate for a LCD device according to the related art. In FIG. 2, a gate line 12 and a data line 34 cross each other and define a pixel area P. A thin film transistor T is formed as a switching element at the crossing of the gate and data lines 12 and 34. A gate pad 10 is formed at one end of the gate line 12, and a data pad 36 is formed at one end of the data line 34. A gate pad terminal 58 and a data pad terminal 60, which have an island shape and are made of a transparent conducting material, overlap the gate pad 10 and the data pad 36, respectively.

The thin film transistor T includes a gate electrode 14 that is connected to the gate line 12 and receives scanning signals, a source electrode 40 that is connected to the data line 34 and receives data signals, and a drain electrode 42 that is spaced apart from the source electrode 40. The thin film transistor T further includes an active layer 32 between the gate electrode 14 and the source and drain electrodes 40 and 42. A metal pattern 38 of an island shape overlaps the gate line 12.

A pixel electrode 56 is formed in the pixel area P and is connected to the drain electrode 42. The pixel electrode 56 is also connected to the metal pattern 38. The gate line 12 and the metal pattern 38 function as first and second storage capacitor electrodes, respectively, and form a storage capacitor Cst with a gate insulating layer (not shown) disposed between the gate line 12 and the metal pattern 38.

Although not shown in the figure, an ohmic contact layer is formed between the active layer 32 and the source and drain electrodes 40 and 42. The active layer 32 is made of amorphous silicon, and the ohmic contact layer is formed of a doped amorphous silicon. A first pattern 35 and a second pattern 39, which include the amorphous silicon and the doped amorphous silicon, are formed under the data line 34 and the metal pattern 38, respectively.

The array substrate of FIG. 2 is fabricated using four masks.

FIGS. 3A to 3G, FIGS. 4A to 4G, and FIGS. 5A to 5G illustrate manufacturing processes of an array substrate using four masks, and correspond to cross-sections along the line III-III, the line IV-IV, and the line V-V of FIG. 2, respectively.

As illustrated in FIGS. 3A, 4A and 5A, a gate line 12, a gate electrode 14 and a gate pad 10 are formed on a transparent insulating substrate 22 by depositing a first metal layer and patterning the first metal layer through a first photolithography process using a first mask. The gate line 12, the gate electrode 14 and the gate pad 10 are made of a metal material such as aluminum (Al), an aluminum alloy, molybdenum (Mo), tungsten (W), and chromium (Cr). The gate line 12, the gate electrode 14 and the gate pad 10 made of aluminum or aluminum alloy may be formed of a double layer including molybdenum or chromium.

Next, a gate insulating layer 16, an amorphous silicon layer 18, a doped amorphous silicon layer 20 and a second metal layer 24 are subsequently deposited on the substrate 22 including the gate line 12, the gate electrode 14 and the gate pad 10 thereon. The gate insulating layer 16 is made of an inorganic insulating material such as silicon nitride (SiNx)

and silicon oxide (SiO$_2$), and the second metal material 24 is formed of one of chromium, molybdenum, tungsten and tantalum (Ta).

As illustrated in FIGS. 3B, 4B and 5B, a photoresist layer 26 is formed on the second metal layer 24 by coating photoresist. A second mask 50, which has a transmitting portion A, a blocking portion B and a half transmitting portion C, is disposed over the photoresist layer 26 spacing apart. The half transmitting portion C corresponds to the gate electrode 14. The photoresist layer 26 may be a positive type, and a portion exposed to light is developed and removed. Subsequently, the photoresist layer 26 is exposed to light. The photoresist layer 26 corresponding to the half transmitting portion C is exposed less than the photoresist layer 26 corresponding to the transmitting portion A.

As illustrated in FIGS. 3C, 4C and 5C, the exposed photoresist layer 26 of FIGS. 3B, 4B and 5B is developed, and a photoresist pattern 26a is formed. Because of the different transmittances of the portions of the second mask 50, the photoresist pattern 26a has different thicknesses. A first thickness of the photoresist pattern 26a corresponds to the blocking portion B of FIGS. 3B, 4B and 5B and a second thickness of the photoresist pattern 26a, which is thinner than the first thickness, corresponds to the half transmitting portion C of FIGS. 3B, 4B and 5B.

As illustrated in FIGS. 3D, 4D and 5D, the second metal layer 24, the doped amorphous silicon layer 20 and the amorphous silicon layer 18 of FIGS. 3C, 4C and 5C exposed by the photoresist pattern 26a are removed. Thus a source and drain pattern 28, a data line 34 of FIG. 2, a data pad 36, a doped amorphous silicon pattern 30a, and an active layer 32 are formed. The second metal layer 24 of FIGS. 3C, 4C and 5C is etched by a wet etching method, and the doped amorphous silicon layer 20 and the amorphous silicon layer 18 of FIGS. 3C, 4C and 5C are patterned by a dry etching method. The source and drain pattern 28 is formed over the gate electrode 14, and is connected to a data line 34 of FIG. 2, which extends vertically in the context of the figure. The doped amorphous silicon pattern 30a and the active layer 32 have the same shape as the source and drain pattern 28 and the data line 34.

At this time, a metal pattern 38 of an island shape is also formed over the gate line 12. A first pattern 35 and a second pattern 39, which include the amorphous silicon layer and the doped amorphous silicon layer, are formed. The first pattern 35 is located under the data line (not shown) and the data pad 36 and the second pattern 39 is situated under the metal pattern 38.

Next, as illustrated in FIGS. 3E, 4E and 5E, the second thickness of the photoresist pattern 26a is removed through an ashing process, and thus the source and drain pattern 28 is exposed. Here, the photoresist pattern 26a of the first thickness is also removed partially and the first thickness of the photoresist pattern 26a is thinned. Additionally, edges of the photoresist pattern 26a are removed, and the metal patterns 28, 36 and 38 are exposed.

As illustrated in FIGS. 3F, 4F and 5F, the source and drain pattern 28 and the doped amorphous silicon pattern 30a of FIG. 3E, which are exposed by the photoresist pattern 26a of FIG. 3E, are etched. Thus, source and drain electrodes 40 and 42 and an ohmic contact layer 30 are formed, and the active layer 32 is exposed. The exposed active layer 32 between the source and drain electrodes 40 and 42 becomes a channel of a thin film transistor. The source and drain electrodes 40 and 42 are spaced apart from each other. A region between the source and drain electrodes 40 and 42 corresponds to the half transmitting portion C of the second mask 50 of FIG. 3B. If the source and drain pattern 28 of FIG. 3E is formed of molybdenum (Mo), the source and drain pattern 28 and the doped amorphous silicon pattern 30a of FIG. 3E can be removed using the dry etching method at one time. However, if the source and drain pattern 28 is formed of chromium (Cr), the source and drain pattern 28 is etched by the wet etching method, and then the doped amorphous silicon pattern 30a is removed by the dry etching method.

As stated above, the source and drain electrodes 40 and 42, the data line 34, the data pad 36, the metal pattern 38, the ohmic contact layer 30 and the active layer 32 are formed through a second photolithography process using the second mask of FIGS. 3B, 4B and 5B.

Next, the photoresist pattern 26a is removed, and a passivation layer 46 is formed on the data line 34, the source and drain electrodes 40 and 42, the data pad 36, and the metal pattern 38 by coating a transparent organic material such as benzocyclobutene (BCB) and acrylic resin or depositing an inorganic material such as silicon nitride (SiNx) and silicon oxide (SiO$_2$). The passivation layer 46 is patterned with the gate electrode 16 through a third photolithography process using a third mask, and a drain contact hole 48, a storage contact hole 51, a gate pad contact hole 52 and a data pad contact hole 54 are formed. The drain contact hole 48, the storage contact hole 51, the gate pad contact hole 52 and the data pad contact hole 54 expose the drain electrode 42, the metal pattern 38, the gate pad 10 and the data pad 36, respectively. Here, the storage contact hole 51 exposes a sidewall of the metal pattern 38.

As illustrated in FIGS. 3G, 4G and 5G, a pixel electrode 56, a gate pad terminal 58 and a data pad terminal 60 are formed on the passivation layer 46 by depositing a transparent conductive material such as indium-tin-oxide (ITO) and indium-zinc-oxide (IZO) and patterning the transparent conductive material through a fourth photolithography process using a fourth mask. The pixel electrode 56 is connected to not only the drain electrode 42 via the drain contact hole 48 but also to the metal pattern 38 through the storage contact hole 51. The gate pad terminal 58 and the data pad terminal 60 are connected to the gate pad 10 and the data pad 36, respectively.

As mentioned above, the array substrate is manufactured through photolithography processes using a mask. The photolithography process includes several steps of cleaning, coating a photo-resist layer, exposing through a mask, developing the photo-resist layer, and etching. Therefore, fabricating time, costs, and failure may be decreased by reducing the number of the photolithography process.

SUMMARY OF THE INVENTION

Accordingly, the present invention is directed to a manufacturing method of an array substrate for a liquid crystal display device that substantially obviates one or more of problems due to limitations and disadvantages of the related art.

An advantage of the present invention is to provide a manufacturing method of an array substrate for a liquid crystal display device that increases productivity because of the shorter processes and the lower cost.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, a method of manufacturing an array substrate for a liquid crystal display device includes the steps of forming a gate line, a gate pad and a gate electrode on a substrate, forming a gate insulating layer on the gate line, the gate electrode and the gate pad, forming an active layer on the gate insulating layer, forming an ohmic contact layer on the active layer, forming a data line, a data pad, and source and drain electrodes on the ohmic contact layer, forming a pixel electrode on the source and drain electrodes, the pixel electrode contacting the drain electrode, forming a first passivation layer on the substrate including the pixel electrode, forming a second passivation layer on the first passivation layer, the second passivation layer exposing the first passivation layer over the gate pad and the data pad, and patterning the first passivation layer exposed by the second passivation layer to expose the gate pad and the data pad.

In another aspect of the present invention, a method of manufacturing an array substrate for a liquid crystal display device includes the steps of depositing a first metal layer on a transparent substrate; patterning the first metal layer to form a gate line; a gate electrode; and a gate pad; forming a gate insulating layer over the transparent substrate and the patterned first metal layer; depositing a doped amorphous silicon layer and a second metal layer over the gate insulating layer; providing a photoresist pattern having first and second thicknesses over the second metal layer; selectively removing portions of the second metal layer according to the photoresist pattern; selectively removing portions of the amorphous silicon layer according to the photoresist pattern and selectively etching the gate insulating layer according to the photoresist pattern; removing a portion of the photoresist pattern having the first thickness; selectively etching the second metal layer exposed by removing the portion of the photoresist pattern having the first thickness; selectively etching the doped amorphous silicon layer exposed by selectively etching the second metal layer exposed by removing the photoresist pattern having the first thickness; removing the remaining photoresist pattern; depositing and patterning a transparent conductive material; forming a first passivation layer on the transparent conductive layer; and forming a second passivation layer over selective portions of the first passivation layer.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to embodiments of the present invention, which are illustrated in the accompanying drawings.

Figure 6:
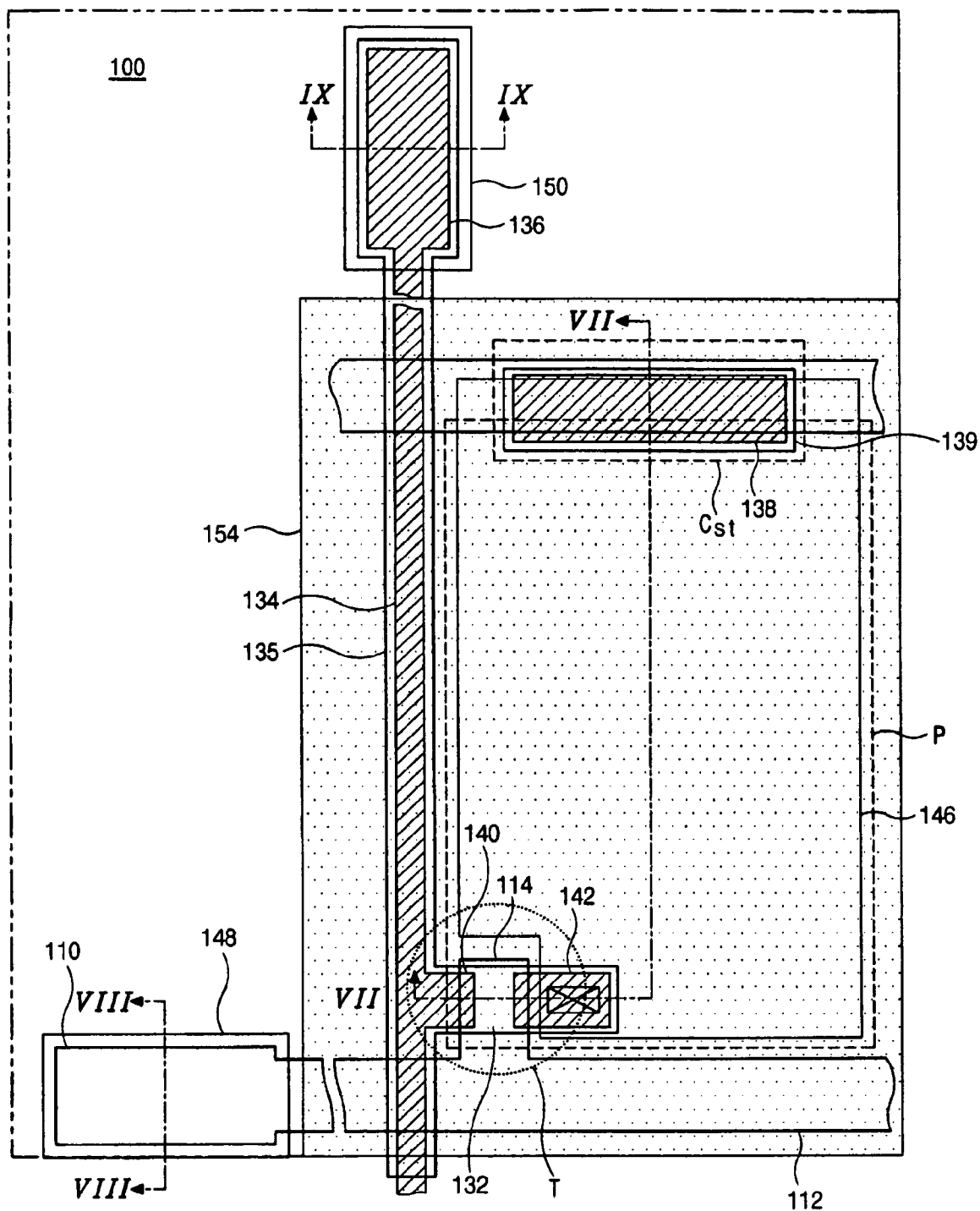
FIG. 6 is a plan view illustrating an array substrate for a liquid crystal display (LCD) device according to an embodiment of the present invention.

FIG. 6 is a plan view of an array substrate for a liquid crystal display (LCD) device according to an embodiment of the present invention.

As illustrated in FIG. 6, a gate line 112 and a data line 134 are formed on a transparent insulating substrate 100. The gate line 112 and the data line 134 cross each other and define a pixel area P. A thin film transistor T is formed as a switching element at the crossing of the gate and data lines 112 and 134. A gate pad 110 is formed at one end of the gate line 112 and a data pad 136 is formed at one end of the data line 134. A gate pad terminal 148 and a data pad terminal 150, which have an island shape and are made of a transparent conducting material, overlap the gate pad 110 and the data pad 136, respectively.

The thin film transistor T is composed of a gate electrode 114 that is connected to the gate line 112 for receiving scanning signals, a source electrode 140 that is connected to the data line 134 for receiving data signals, and a drain electrode 142 that spaces apart from the source electrode 140. The thin film transistor T further includes an active layer 132 between the gate electrode 114 and the source and drain electrodes 140 and 142. A metal material 138 overlaps the gate line 112. The metal material 138 may be made of the same material as the data line 134.

A pixel electrode 146 is formed in the pixel area P. The pixel electrode 146 is connected to the drain electrode 142 and the metal pattern 138 with side contact. The gate line 112 and the metal pattern 138 function as first and second storage capacitor electrodes, respectively, and form a storage capacitor Cst with a gate insulating layer (not shown) disposed between the gate line 112 and the metal pattern 138.

A transparent organic layer 154 is formed in a region except for the gate pad 110 and the data pad 136.

Although not shown in the figure, an ohmic contact layer is formed between the active layer 132 and the source and drain electrodes 140 and 142. The active layer 132 is made of amorphous silicon, and the ohmic contact layer is formed of a doped amorphous silicon. A first pattern 135 and a second pattern 139, which include the amorphous silicon and the doped amorphous silicon, are formed under the data line 134 and the metal pattern 138, respectively.

FIGS. 7A to 7H, FIGS. 8A to 8H, and FIGS. 9A to 9H illustrate a method of manufacturing an array substrate corresponding to the present invention, and are cross-sections along the line VII-VII, the line VIII-VIII and the line IX-IX of FIG. 6, respectively.

Figure 7A:
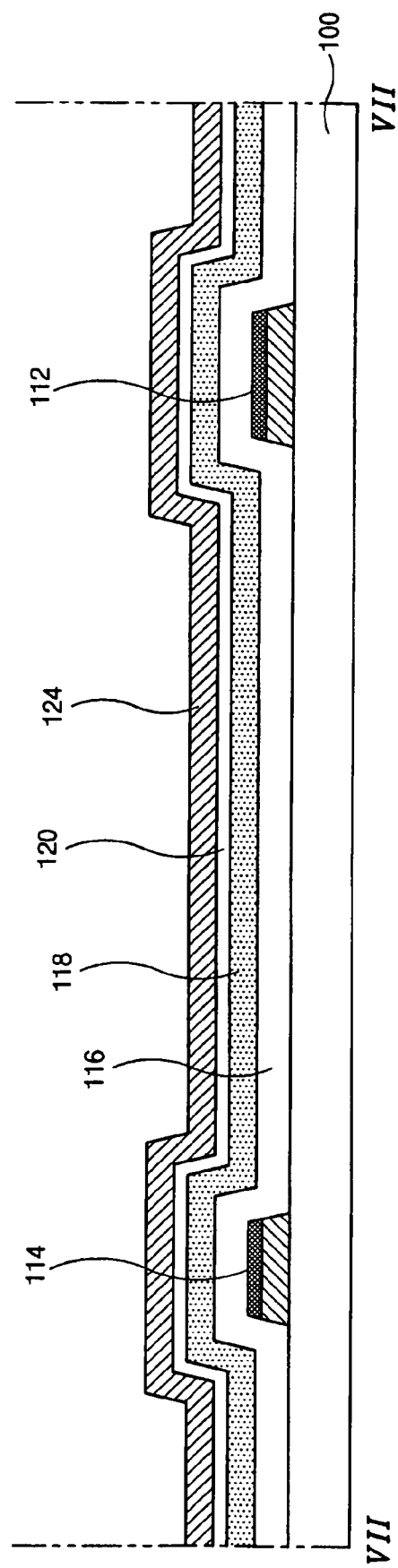
FIGS. 7A to 7H, FIGS. 8A to 8H, and FIGS. 9A to 9H are cross-sectional views illustrating a manufacturing of an array substrate corresponding to the present invention.
Figure 8A:
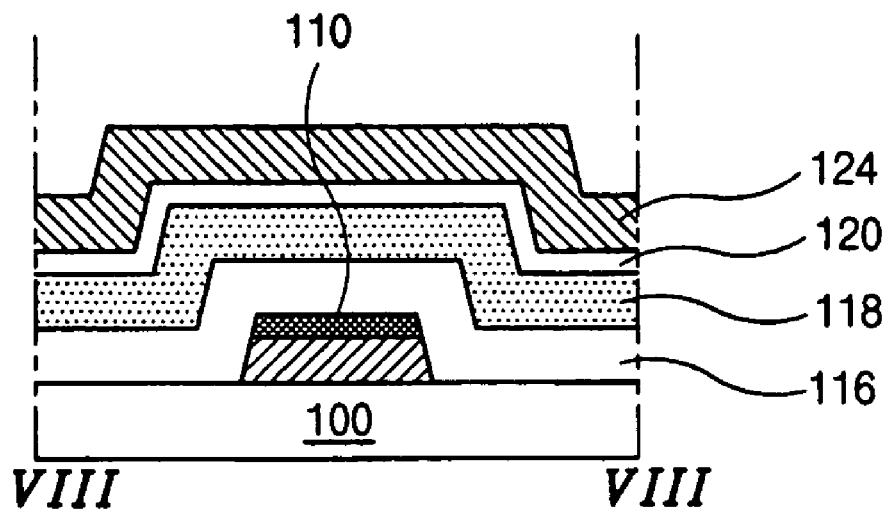
Figure 9A:
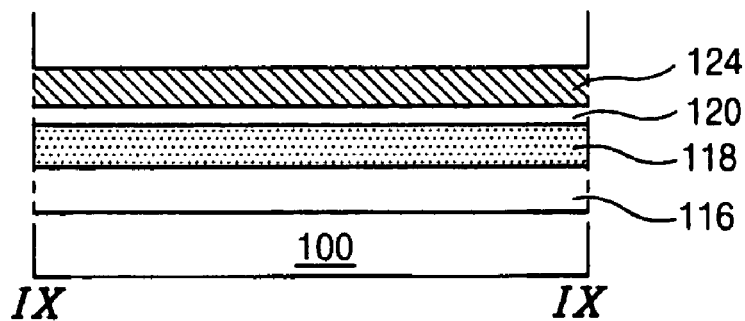

First, as illustrated in FIGS. 7A, 8A and 9A, a gate line 112, a gate electrode 114, and a gate pad 110 are formed on a transparent insulating substrate 100 by depositing a first metal layer and patterning the first metal layer through a first photolithography process using a first mask. The gate electrode 114 is extended from the gate line 112, and the gate pad 110 is situated at one end of the gate line 112. In order to prevent RC delay, aluminum (Al), which has a relatively low resistivity, is widely used as a gate electrode material. However, pure aluminum is easily corroded by acid and may cause line defects due to hillocks in the following process under high temperatures. Therefore, an aluminum alloy may be used or a double layer including aluminum and other metal material, such as molybdenum.

Next, a gate insulating layer 116, an amorphous silicon layer 118, a doped amorphous silicon layer 120 and a second metal layer 124 are deposited on the substrate 100 including the gate line 112, the gate electrode 114 and the gate pad 110 thereon. The gate insulating layer 116 is made of an inorganic insulating material such as silicon nitride (SiNx) and silicon oxide ($SiO_2$). The gate insulating layer 116 may be formed of an organic insulating material such as benzocyclobutene (BCB) and acrylic resin. The second metal layer 124 is made of one of chromium, molybdenum, tungsten and tantalum (Ta).

Figure 7B:
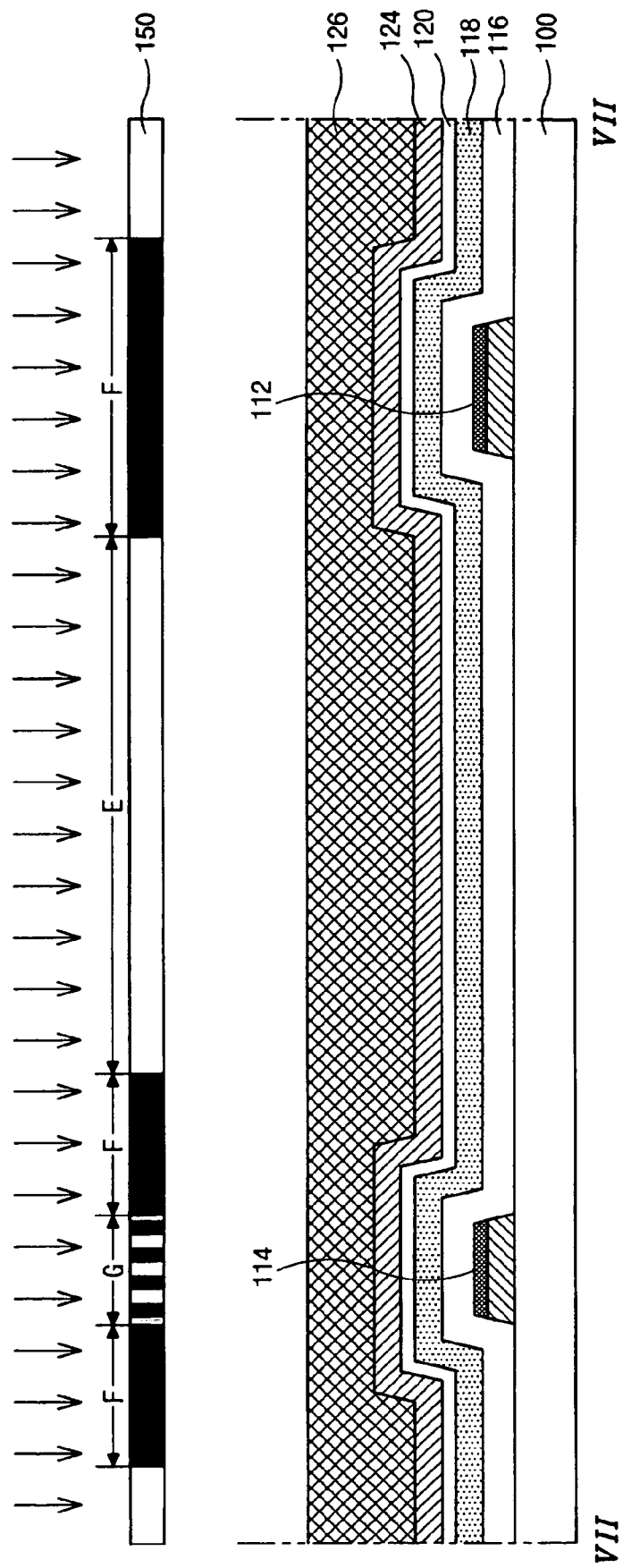
Figure 8B:
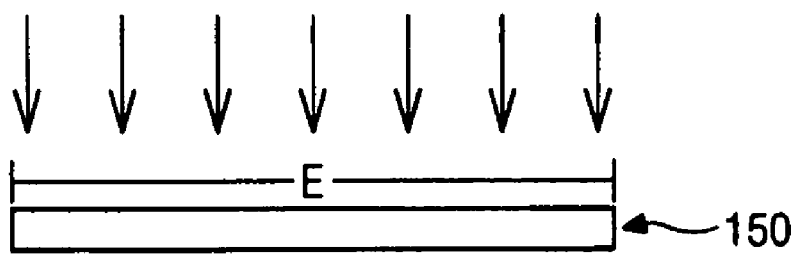
Figure 8B:
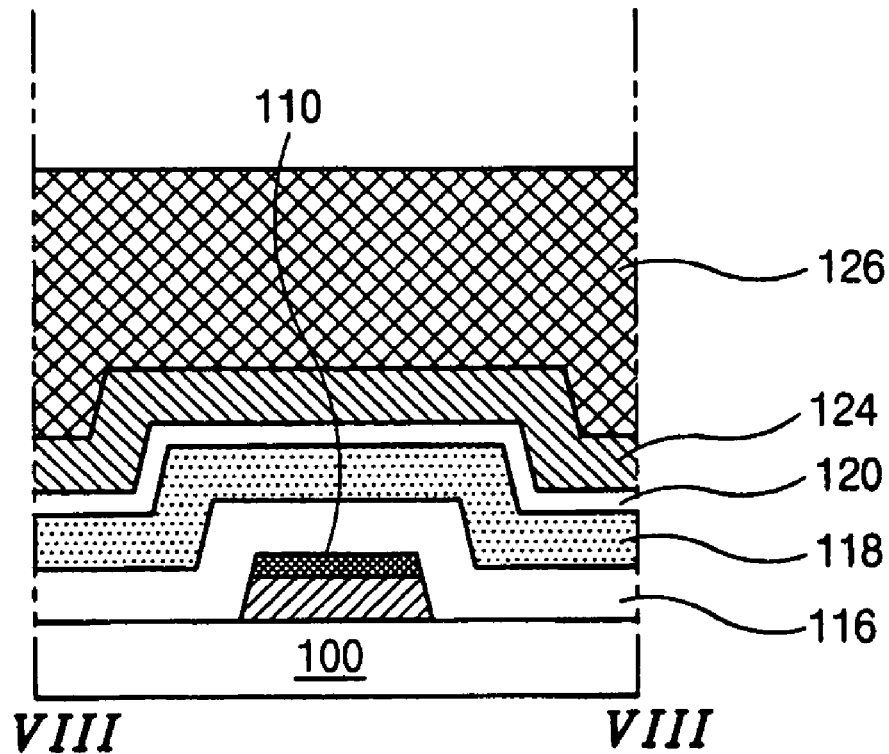
Figure 9B:
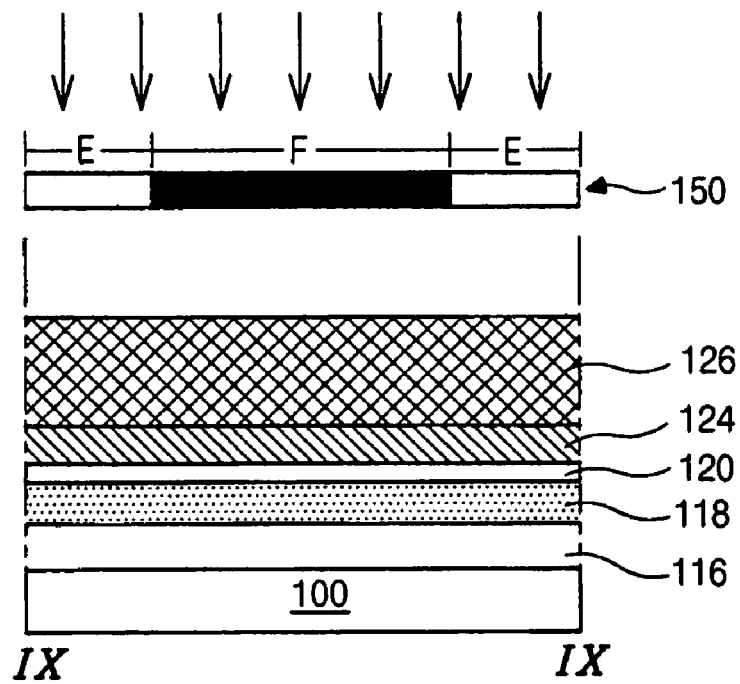

As illustrated in FIGS. 7B, 8B and 9B, a photoresist layer 126 is formed on the second metal layer 124 by coating photoresist. A second mask 150, which has a transmitting portion E, a blocking portion F and a half transmitting portion G, is disposed over and spaced apart from the photoresist layer 126. The half transmitting portion G may include slits and corresponds to a channel of a thin film transistor. The photoresist layer 126 may be a positive type, and thus a portion exposed to light is developed and removed. Subsequently, the photoresist layer 126 is exposed to light, and the photoresist layer 126 corresponding to the half transmitting portion G is exposed less than the photoresist layer 126 corresponding to the transmitting portion E.

Figure 7C:
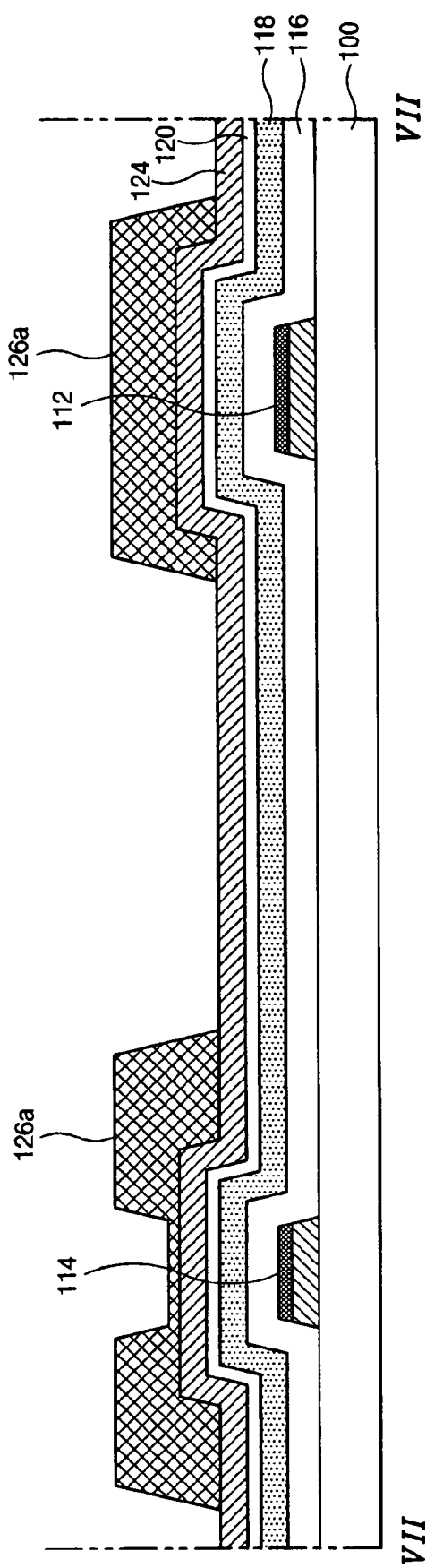
Figure 8C:
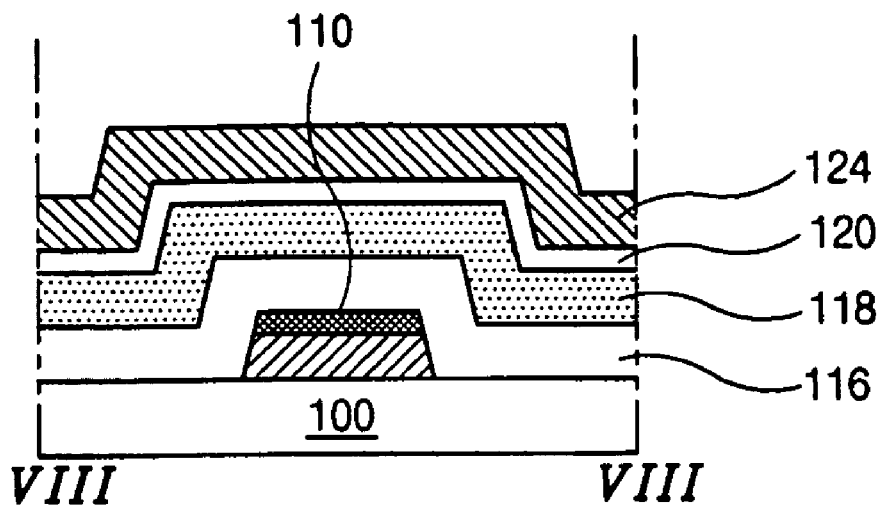
Figure 9C:
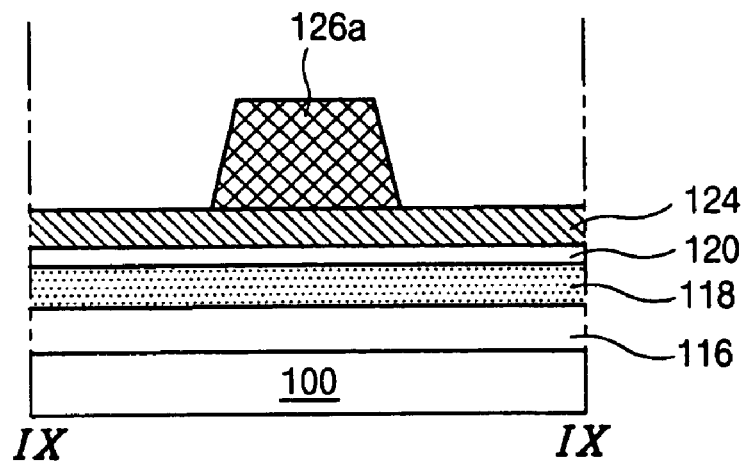

Next, as illustrated in FIGS. 7C, 8C and 9C, the photoresist layer 126 of FIGS. 7B, 8B and 9B is developed, and a photoresist pattern 126a having different thicknesses is formed. A first thickness of the photoresist pattern 126a corresponds to the blocking portion F of FIGS. 7B, 8B and 9B, and a second thickness of the photoresist pattern 126a, which is thinner than the first thickness, corresponds to the half transmitting portion G of FIG. 7B.

Figure 7D:
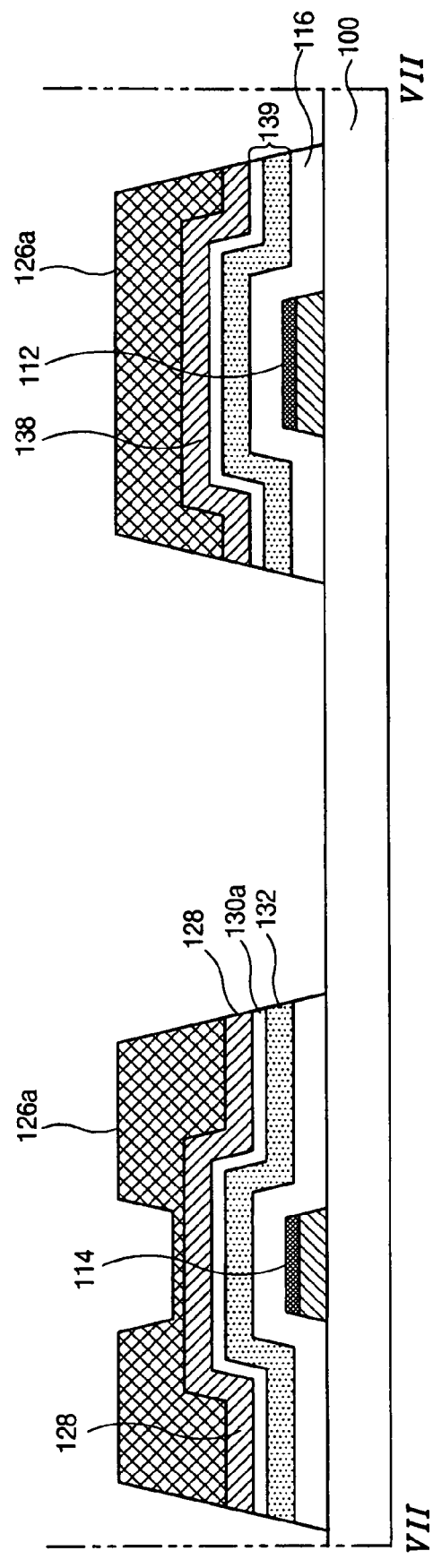
Figure 8D:
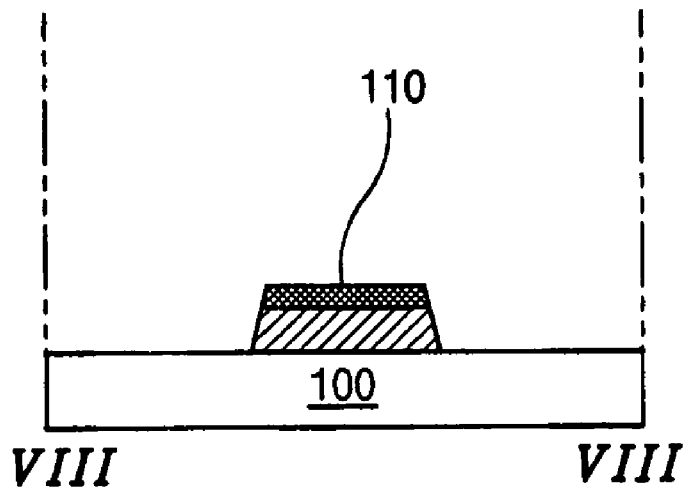
Figure 9D:
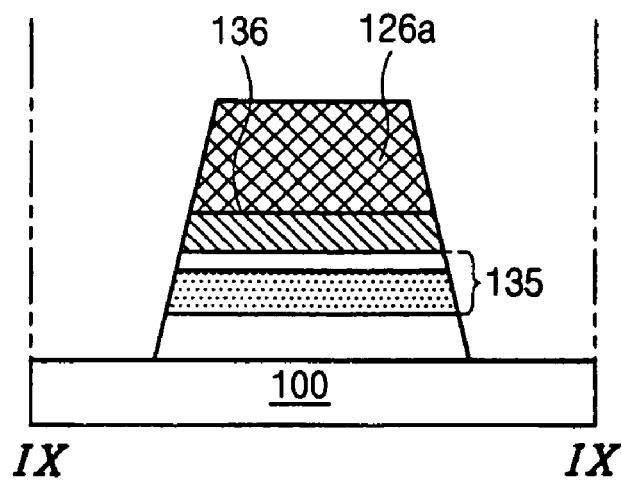

As illustrated in FIGS. 7D, 8D and 9D, the second metal layer 124, the doped amorphous silicon layer 120 and the amorphous silicon layer 118 of FIGS. 7C, 8C and 9C exposed by the photoresist pattern 126a are removed. Thus a source and drain pattern 128, a data line 134 of FIG. 6, a data pad 136, a doped amorphous silicon pattern 130a and an active layer 132 are formed. The second metal layer 124 of FIGS. 7C, 8C and 9C is etched by a wet etching method, and the doped amorphous silicon layer 120 and the amorphous silicon layer 118 FIGS. 7C, 8C and 9C are patterned by a dry etching method. The source and drain pattern 128 is formed over the gate electrode 114 and is connected to a data line 134 of FIG. 6, which extends vertically in the context of the figure. The doped amorphous silicon pattern 130a and the active layer 132 have the same shape as the source and drain pattern 128 and the data line 134. At this time, a metal pattern 138 of an island shape is also formed over the gate line 112. A first pattern 135 and a second pattern 139, which include the amorphous silicon layer and the doped amorphous silicon layer, are formed. The first pattern 135 is located under the data line (not shown) and the data pad 136 and the second pattern 139 is situated under the metal pattern 138. Here, the gate insulating layer 116 is also etched, and the substrate 110 and the gate pad 110 may be exposed.

Figure 7E:
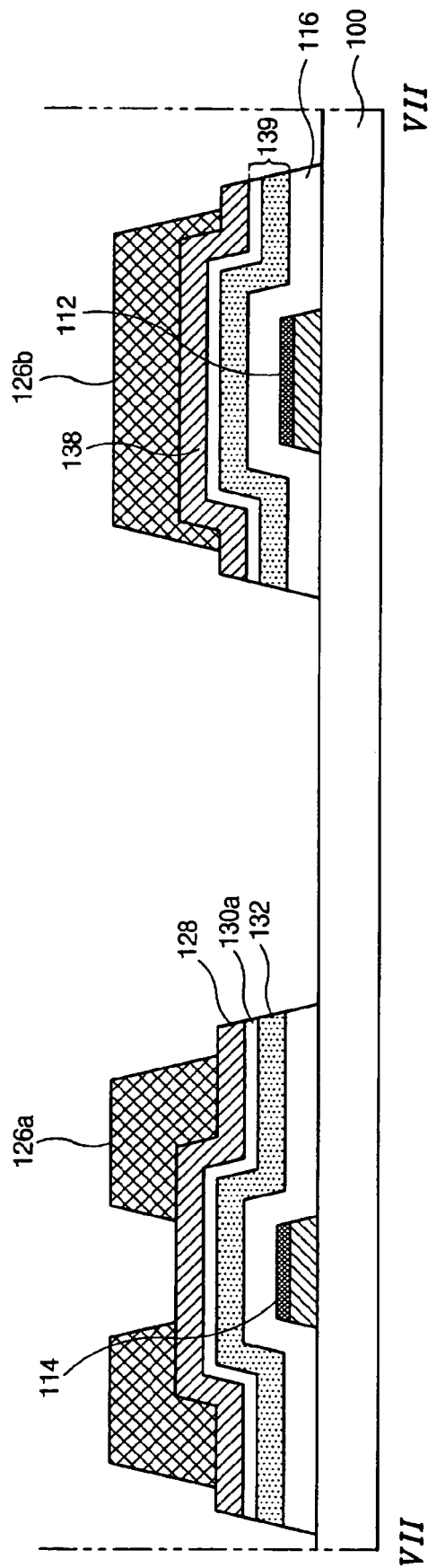
Figure 8E:
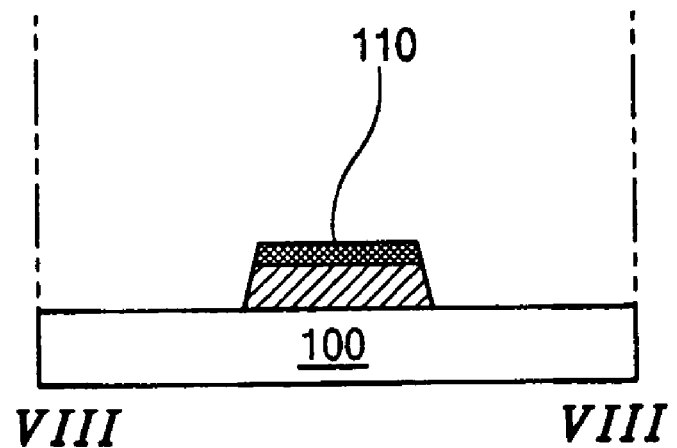
Figure 9E:
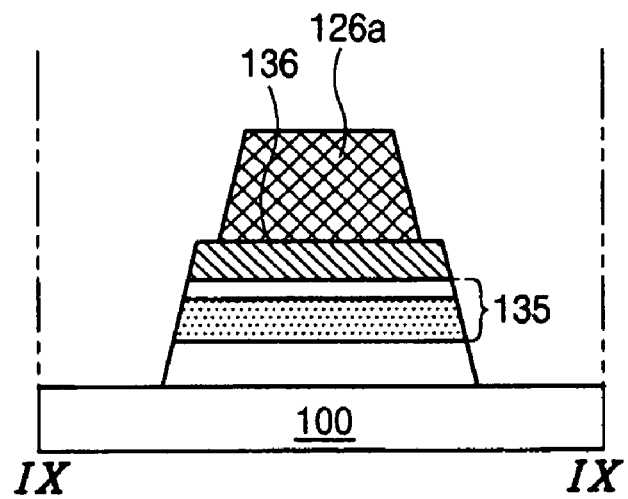

Next, as illustrated in FIGS. 7E, 8E and 9E, the second thickness of the photoresist pattern 126a is removed through an ashing process, and thus the source and drain pattern 128 is exposed. Here, the first thickness of the photoresist pattern 126a is also removed partially and the first thickness of the photoresist pattern 126a is thinned. Additionally, edges of the photoresist pattern 126a are removed, and the metal patterns 128, 136 and 138 are exposed.

Figure 1:
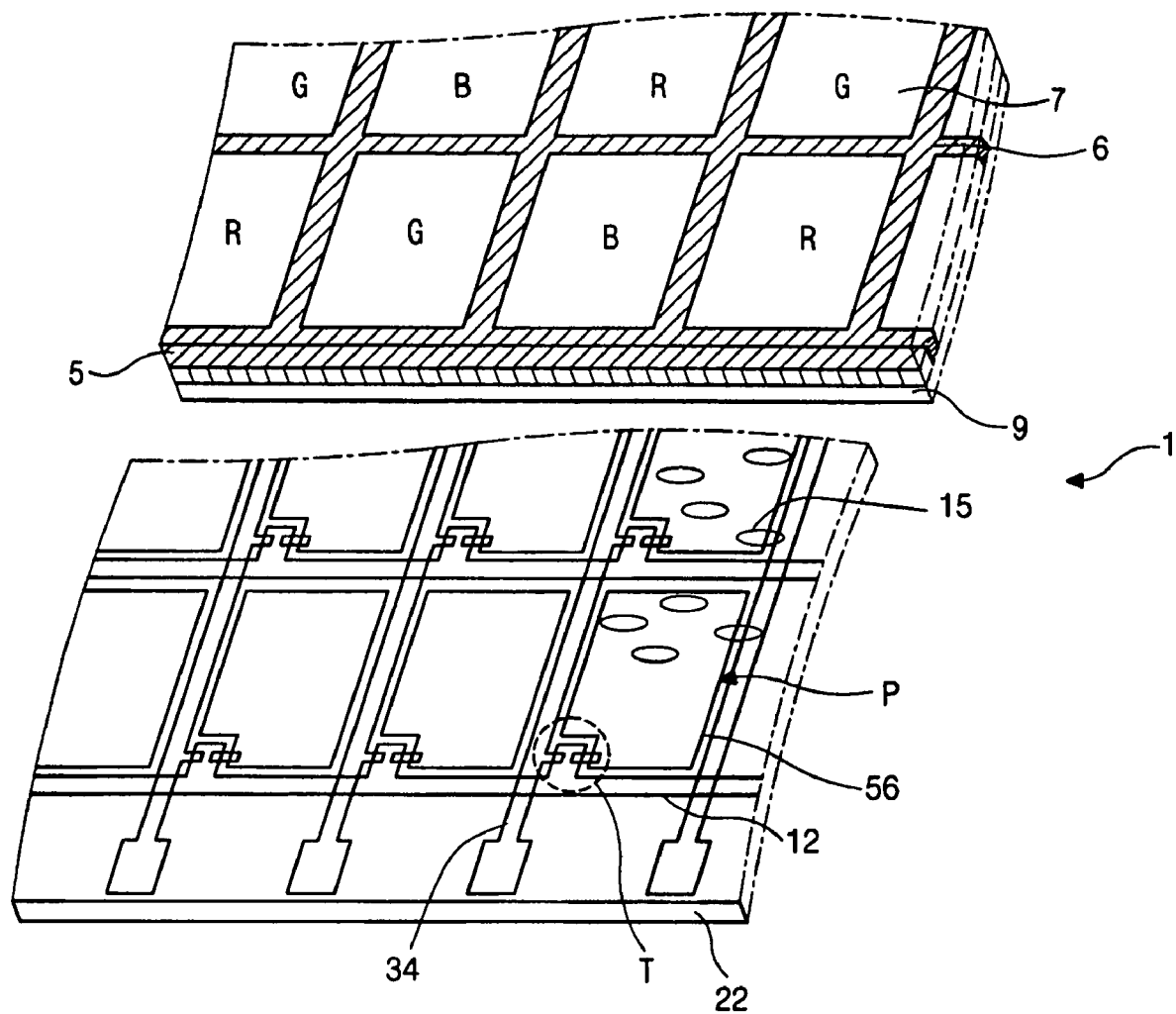
FIG. 1 is an exploded perspective view illustrating a related art liquid crystal display (LCD) device.
Figure 2:
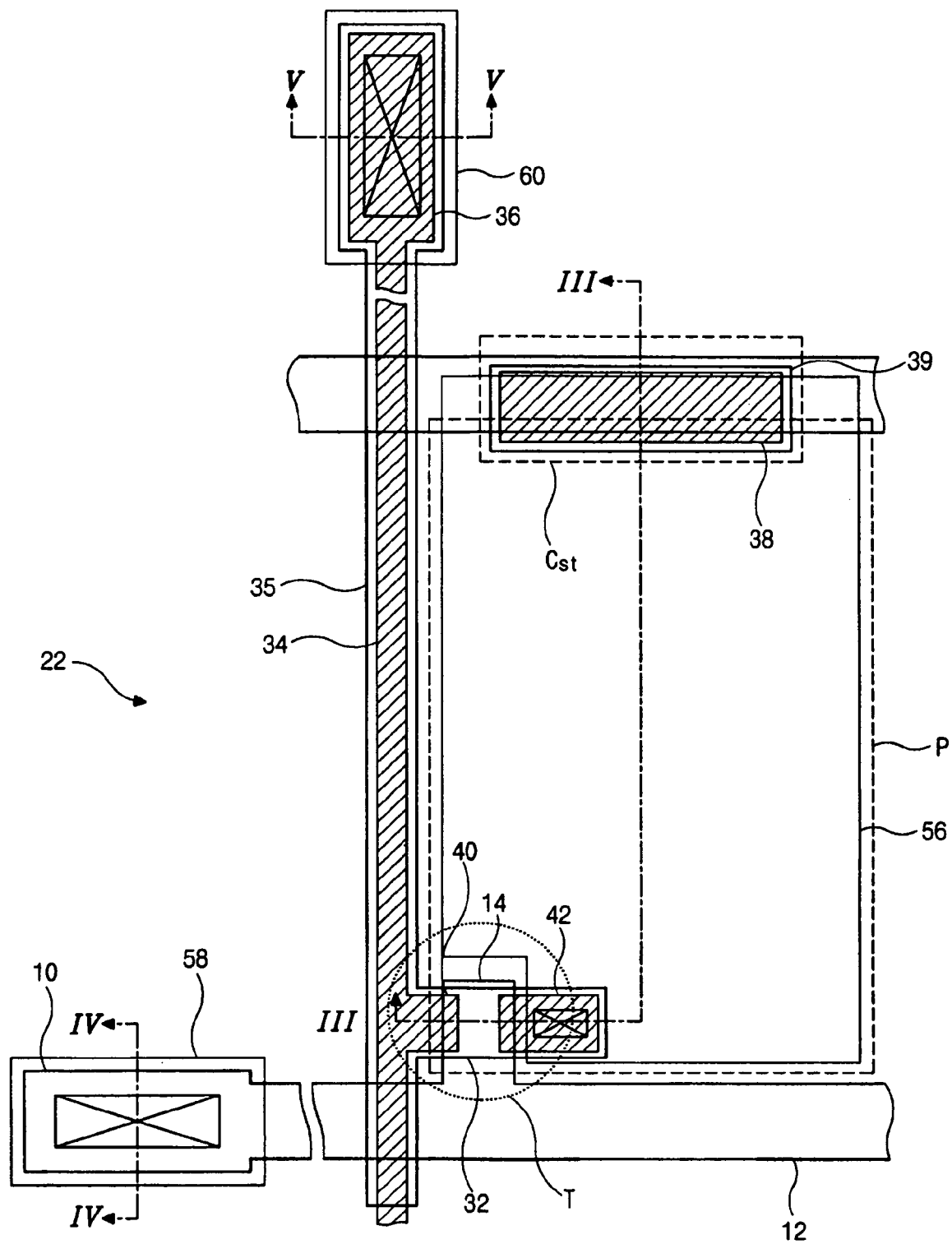
FIG. 2 is a plan view illustrating an array substrate for a LCD device according to the related art.
Figure 3A:
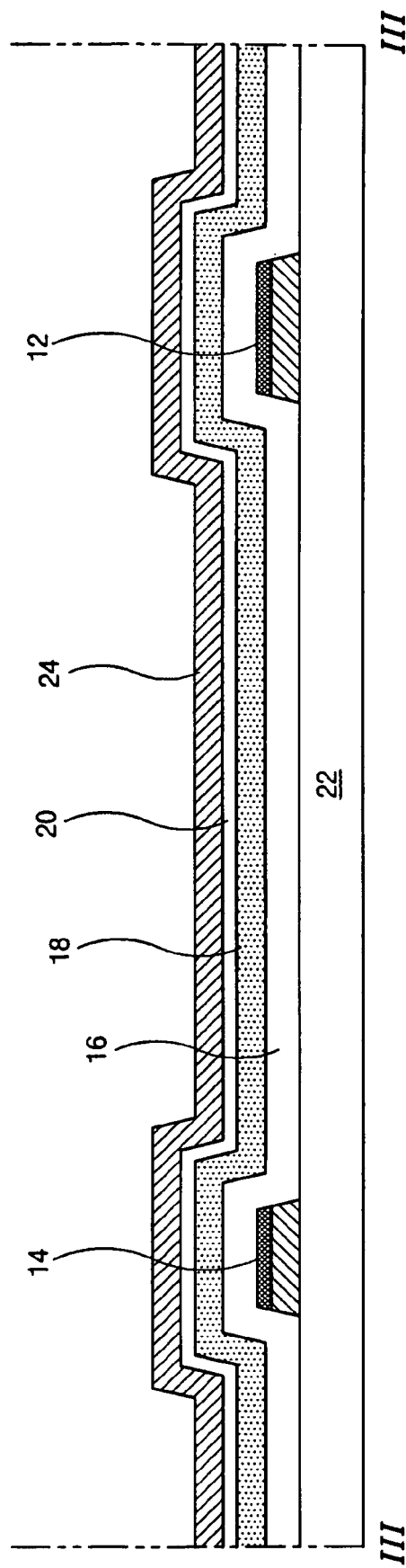
FIGS. 3A to 3G, FIGS. 4A to 4G, and FIGS. 5A to 5G are cross-sectional views illustrating manufacturing method of an array substrate according to the related art.
Figure 3B:
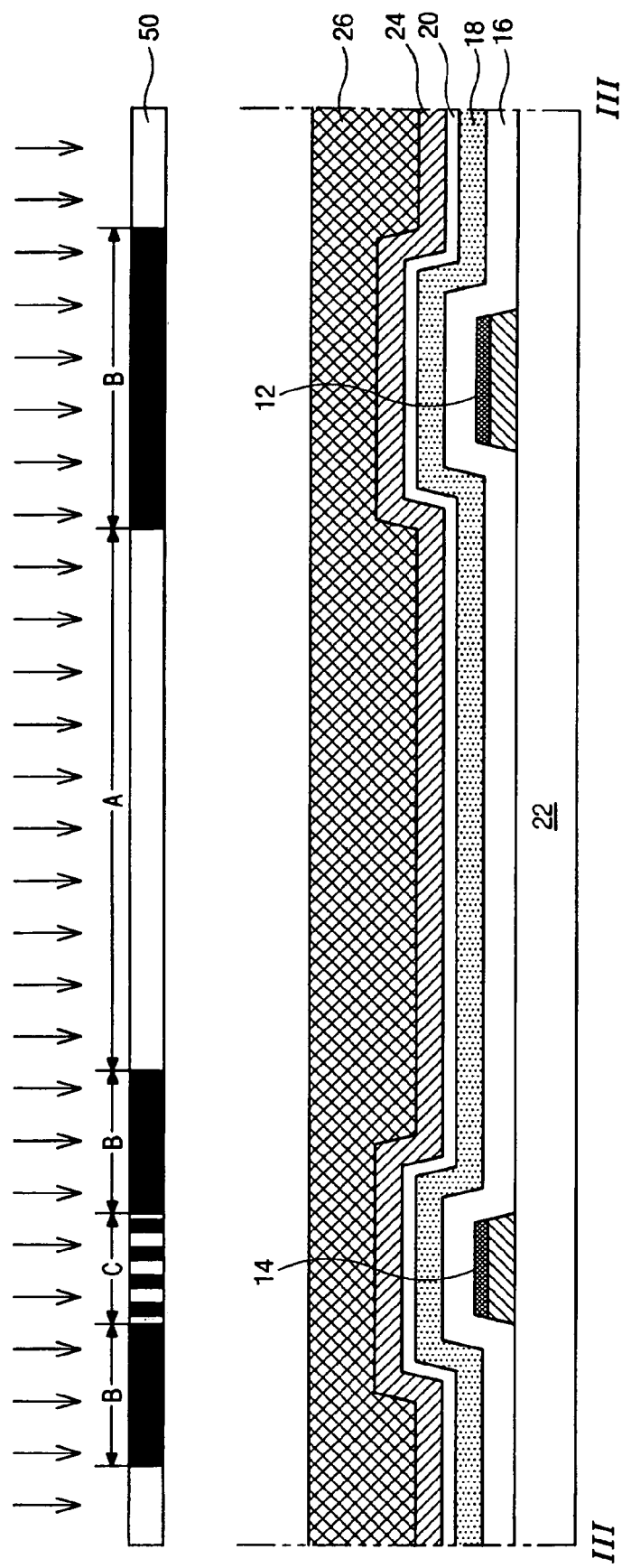
Figure 3C:
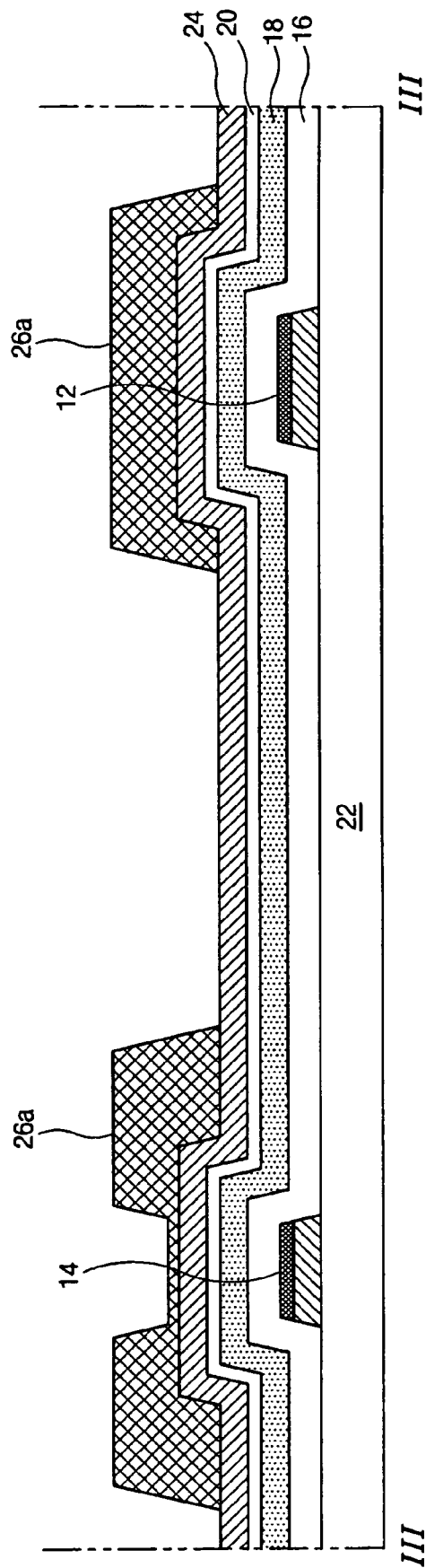
Figure 3D:
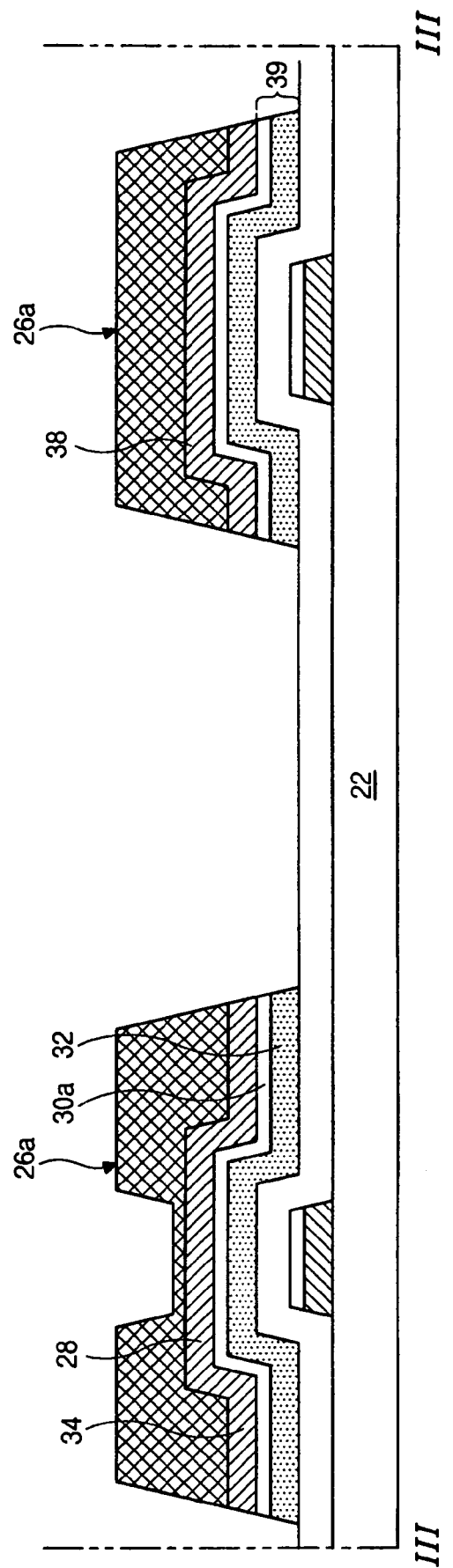
Figure 3E:
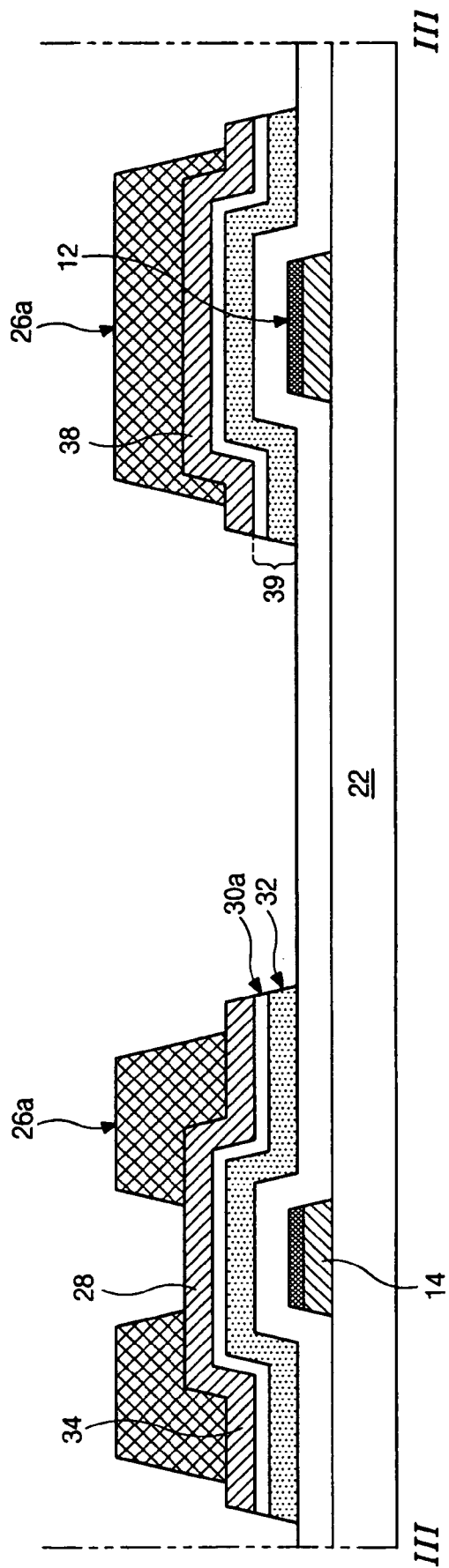
Figure 3F:
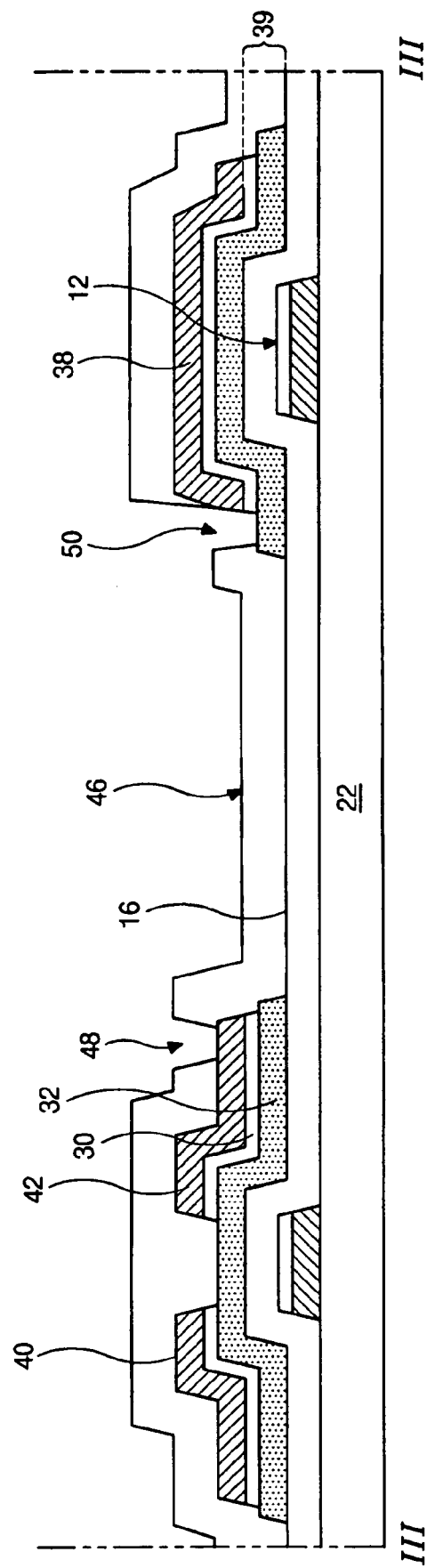
Figure 3G:
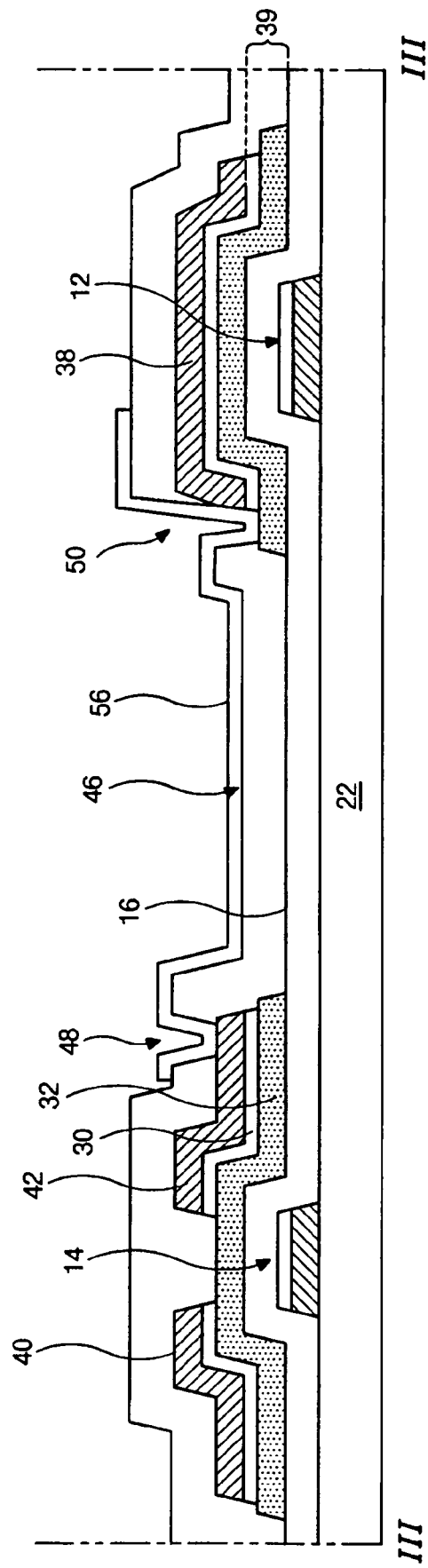
Figure 4A:
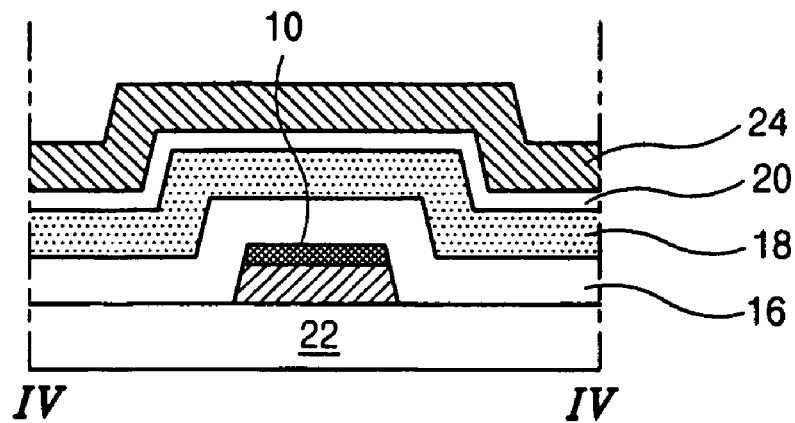
Figure 4B:
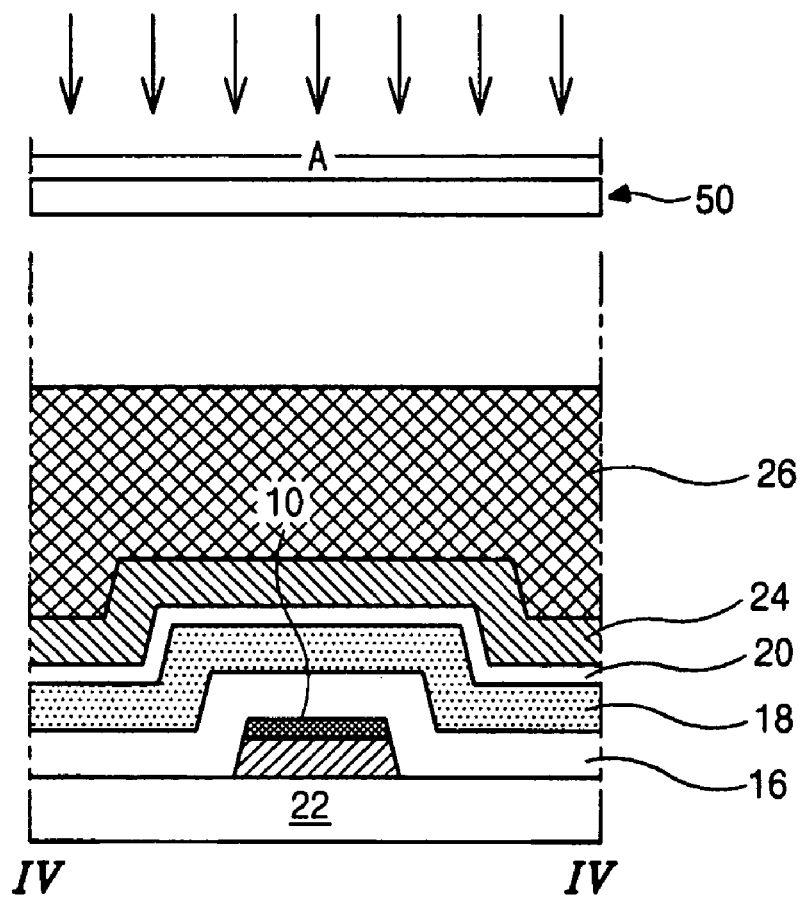
Figure 4C:
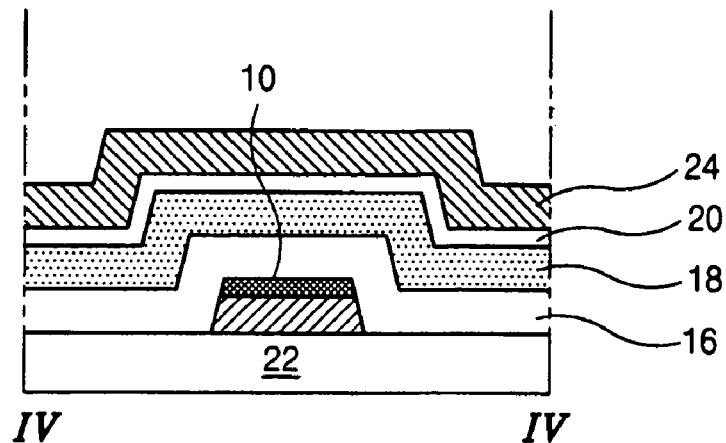
Figure 4D:
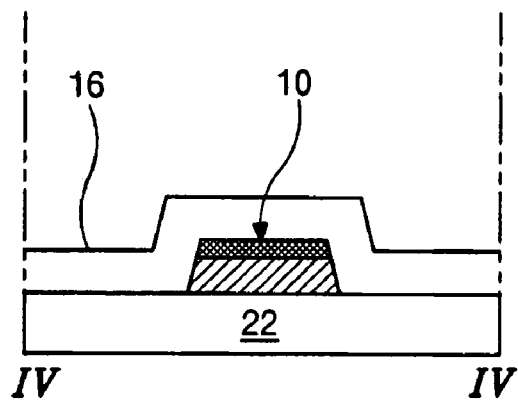
Figure 4E:
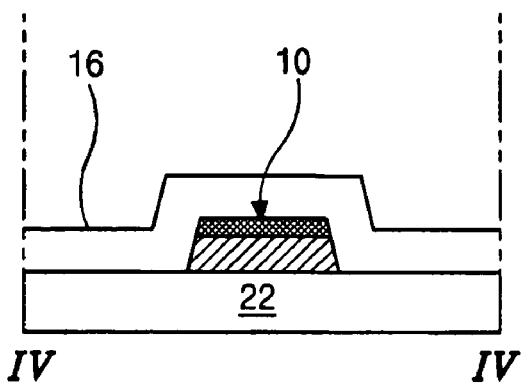
Figure 4F:
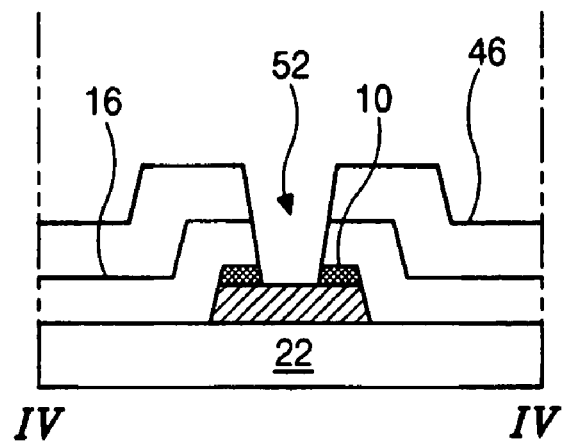
Figure 4G:
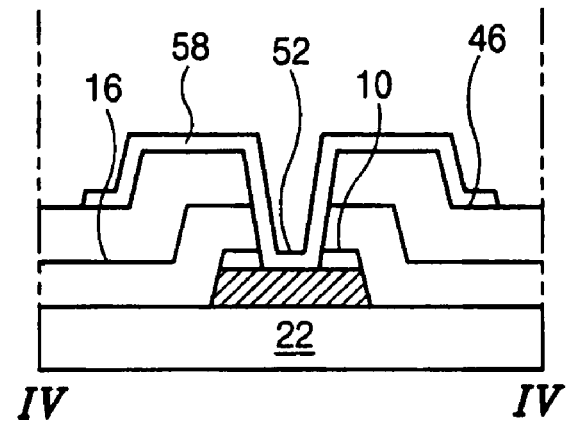
Figure 5A:
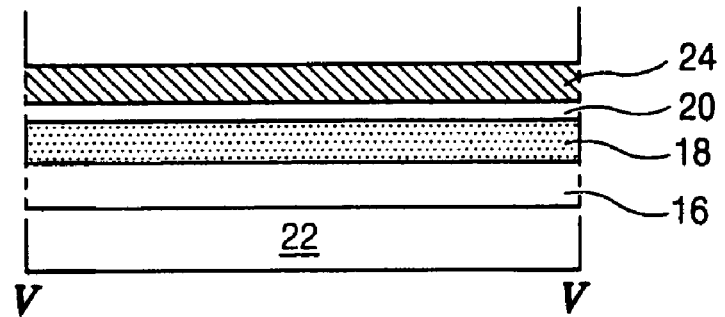
Figure 5B:
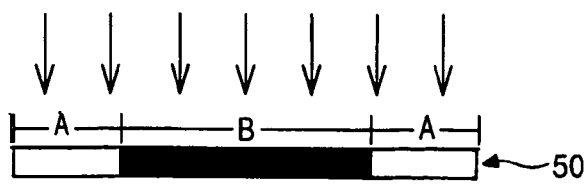
Figure 5B:
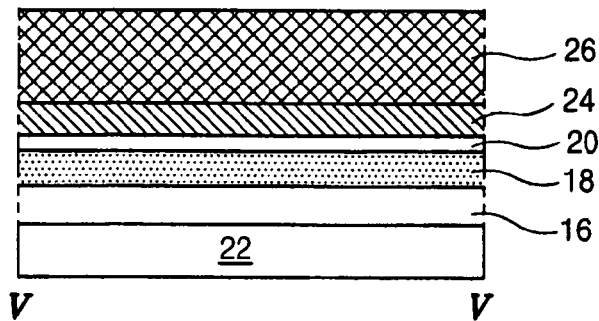
Figure 5C:
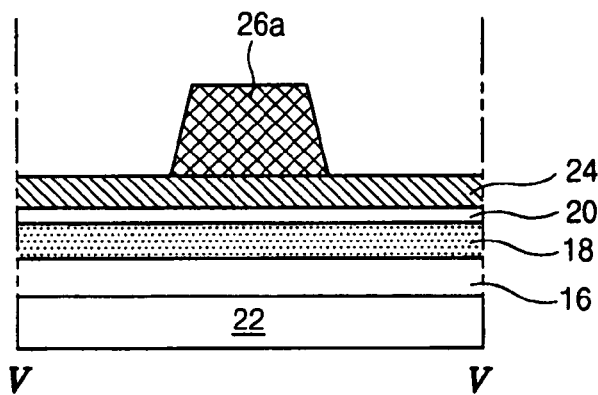
Figure 5D:
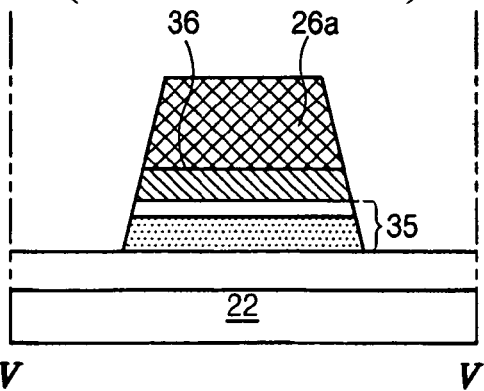
Figure 5E:
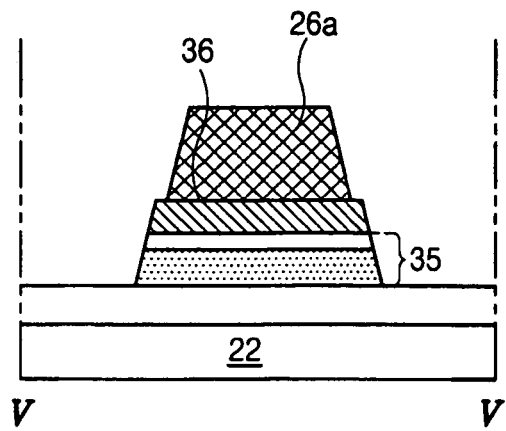
Figure 5F:
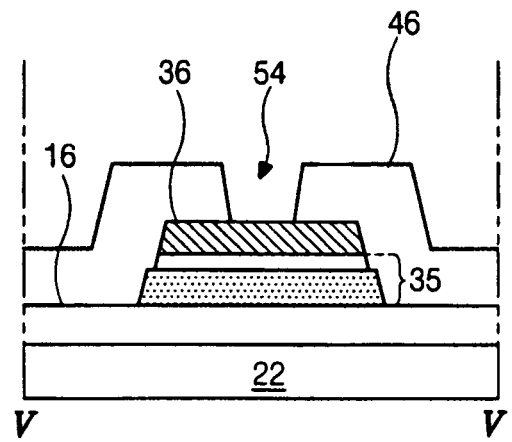
Figure 5G:
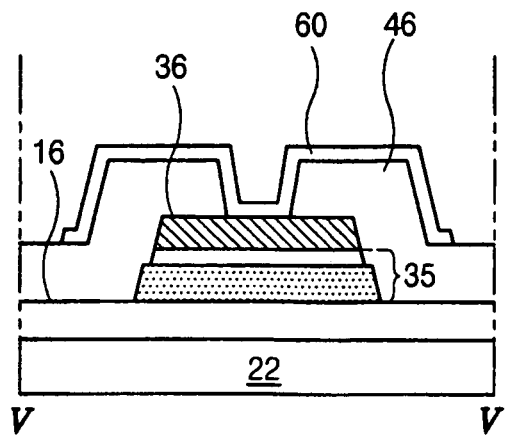
Figure 7F:
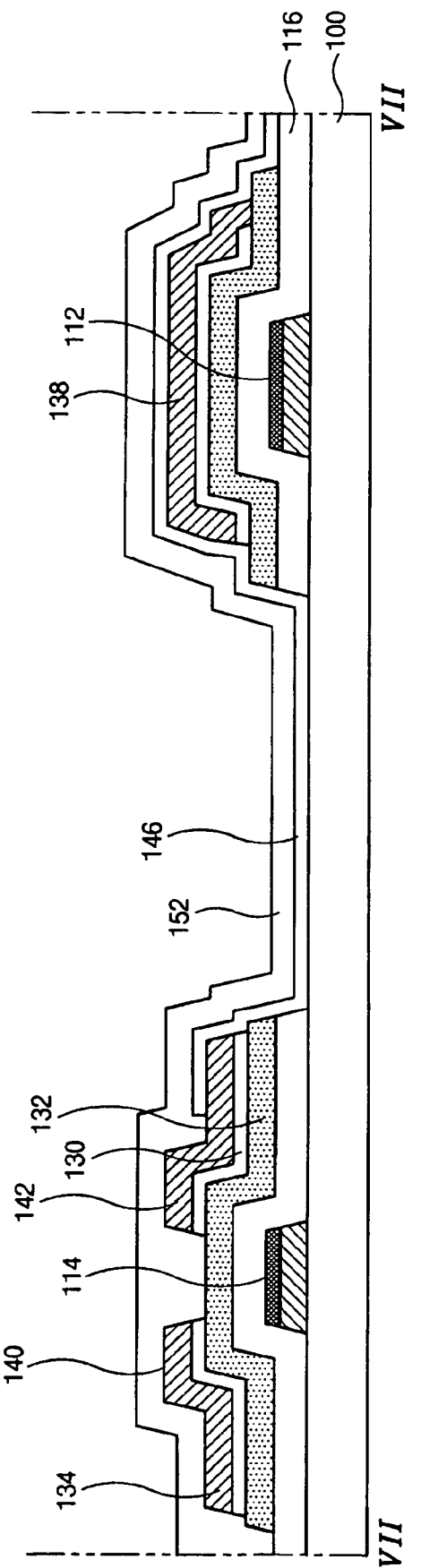
Figure 8F:
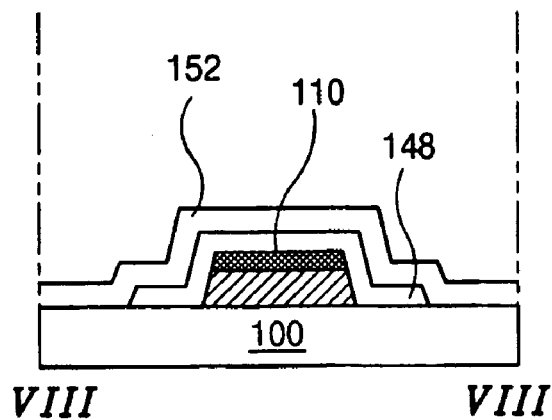
Figure 9F:
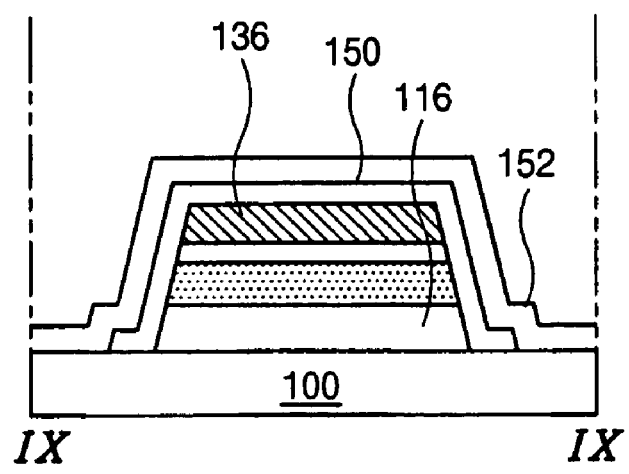

As illustrated in FIGS. 7F, 8F and 9F, the source and drain pattern 128 and the doped amorphous silicon pattern 130a of FIG. 7E, which are exposed by the photoresist pattern 126a of FIG. 7E, are etched. Thus, source and drain electrodes 140 and 142 and an ohmic contact layer 130 are formed, and the active layer 132 is exposed. The exposed active layer 132 between the source and drain electrode 140 and 142 becomes a channel of a thin film transistor and corresponds to the half transmitting portion G of the second mask 150 of FIG. 7B. The source and drain electrodes 140 and 142 are spaced apart from each other. If the source and drain pattern 128 of FIG. 7E is formed of molybdenum (Mo), the source and drain pattern 128 and the doped amorphous silicon pattern 130a of FIG. 3E can be removed using the dry etching method at one time. However, if the source and drain pattern 128 is formed of chromium (Cr), the source and drain pattern 128 is etched by the wet etching method, and then the doped amorphous silicon pattern 130a is removed by the dry etching method.

As stated above, the source and drain electrodes 140 and 142, the data line 134, the data pad 136, the metal pattern 138, the ohmic contact layer 130 and the active layer 132 are formed through a second mask process using the second mask 150 of FIGS. 7B, 8B and 9B.

Next, the photoresist pattern 126a is removed, and a pixel electrode 146, a gate pad terminal 148 and a data pad terminal 160 are formed on the substrate 100 including the source and drain electrodes 140 and 142 by depositing a transparent conductive material such as indium-tin-oxide (ITO) and indium-zinc-oxide (IZO) and patterning the transparent conductive material through a third photolithography process using a third mask. The pixel electrode 146 is connected to not only the drain electrode 142 but also the metal pattern 138 with side contacts. The gate pad terminal 148 and the data pad terminal 160 are in contact with the gate pad 110 and the data pad 136, respectively.

A first passivation layer 152 is formed on the pixel electrode 146, the gate pad terminal 148 and the data pad terminal 150 by depositing an inorganic material such as silicon nitride (SiNx) and silicon oxide ($SiO_2$) under the temperature of about 300 degrees Celsius. The first passivation layer 152 has a thickness within a range of about 500 Å to about 1,000 Å. The first passivation layer 152 of the inorganic insulating material is better than an organic insulating material in contacting the active layer. At this time, the pixel electrode 146, the gate pad terminal 148 and the data pad terminal 160 are changed from amorphous phase into crystalline phase.

Figure 7G:
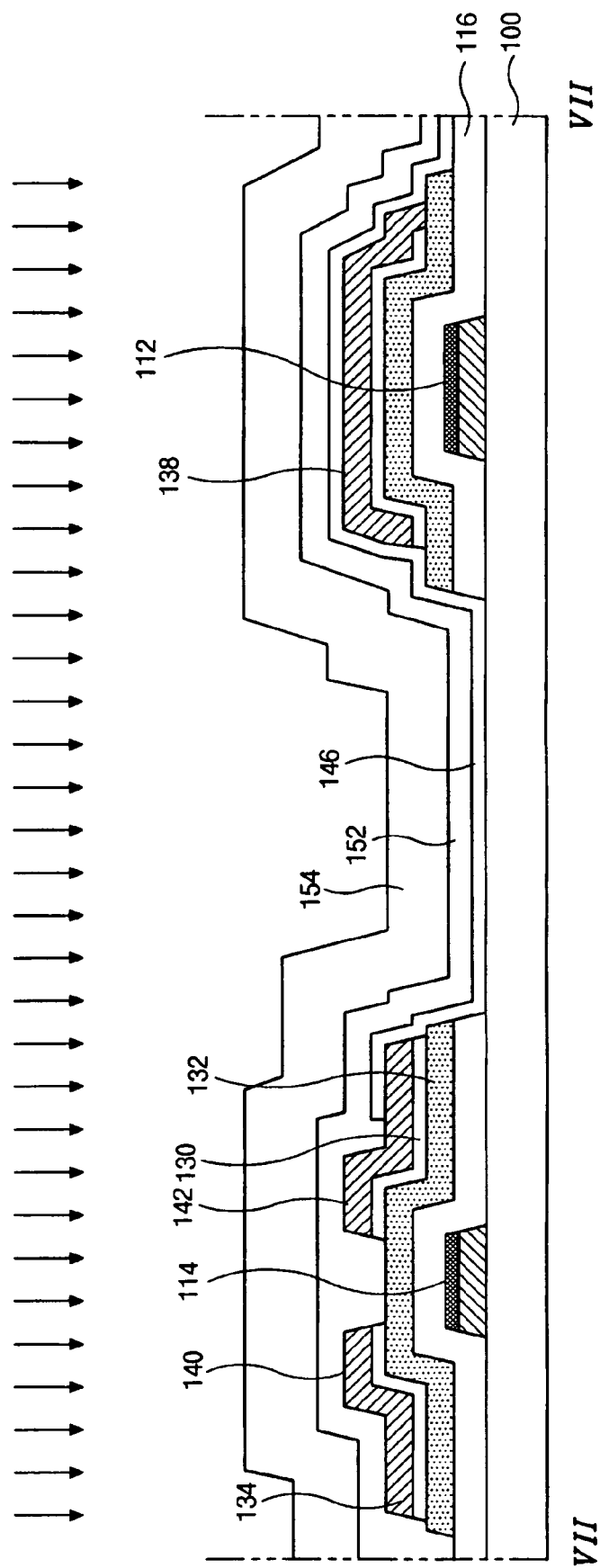
Figure 8G:
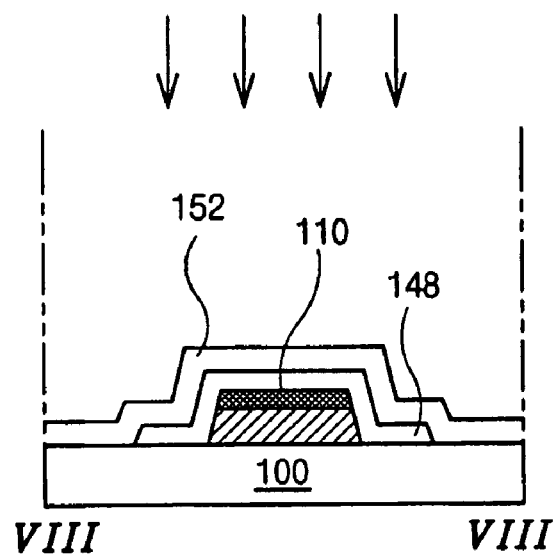
Figure 9G:
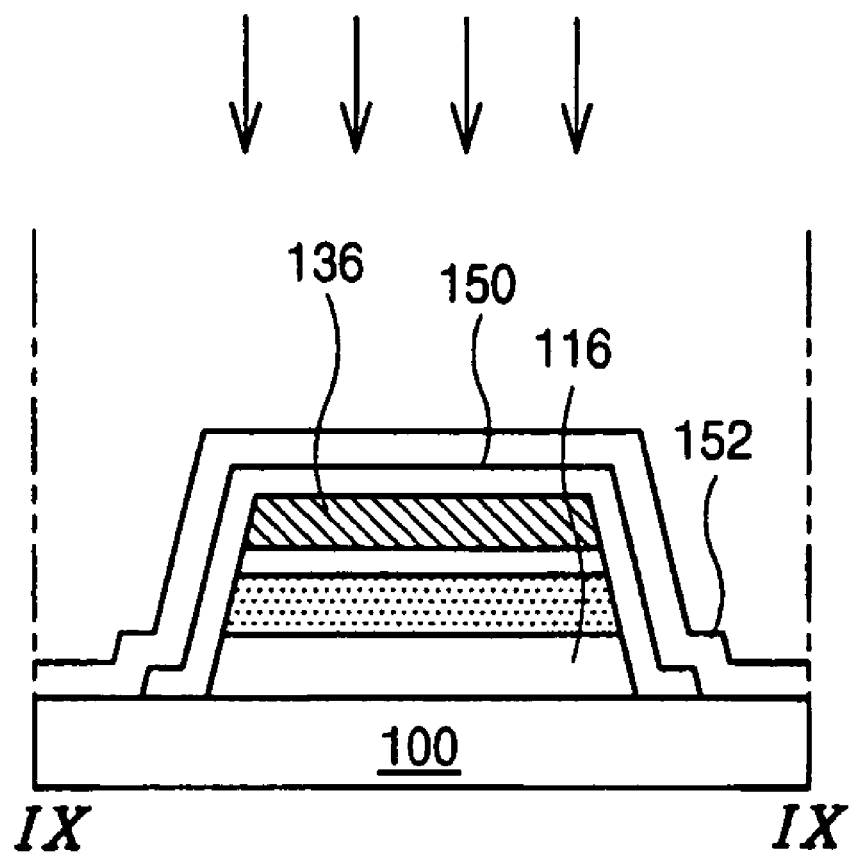

As illustrated in FIGS. 7G, 8G and 9G, a second passivation layer 154 is formed on the first passivation layer 152 except for the gate pad 110 and the data pad 136 by printing a transparent organic material. The transparent organic material may be made of polyimide, for example. Subsequently, the first passivation layer 154 exposed by the second passivation layer 156 is dry-etched.

Figure 7H:
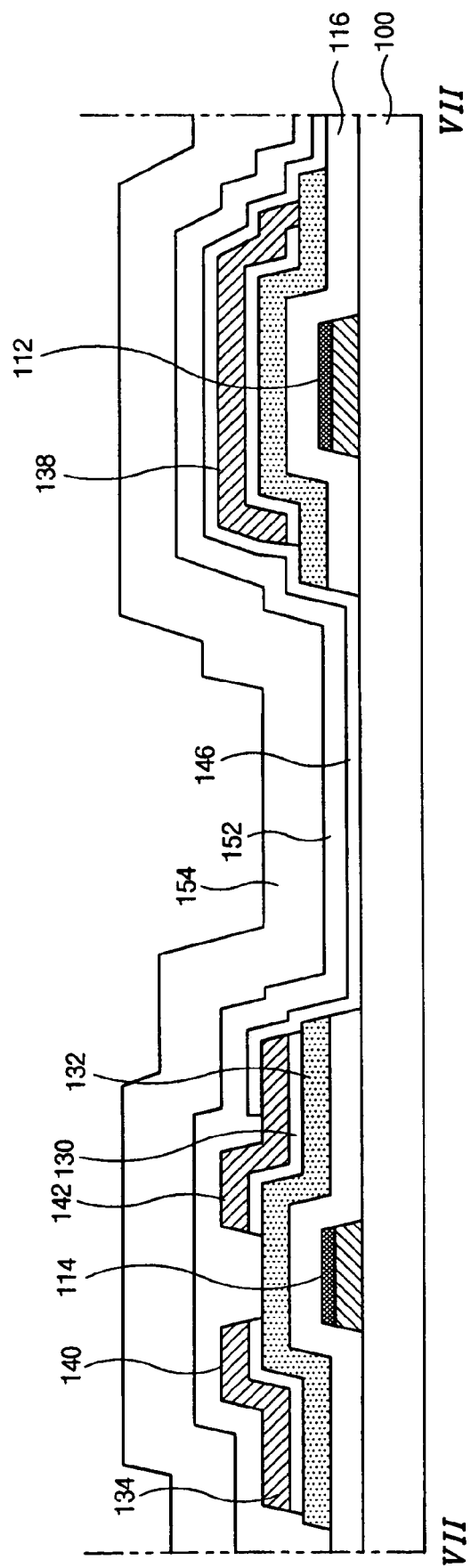
Figure 8H:
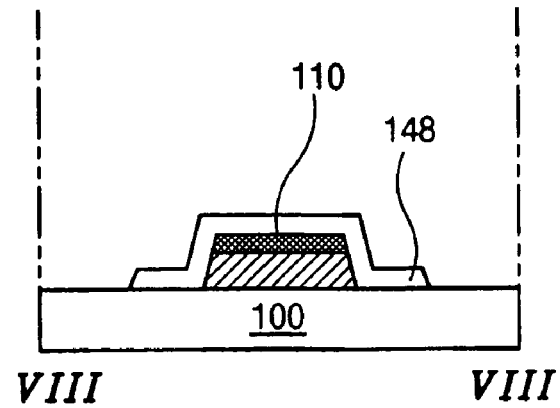
Figure 9H:
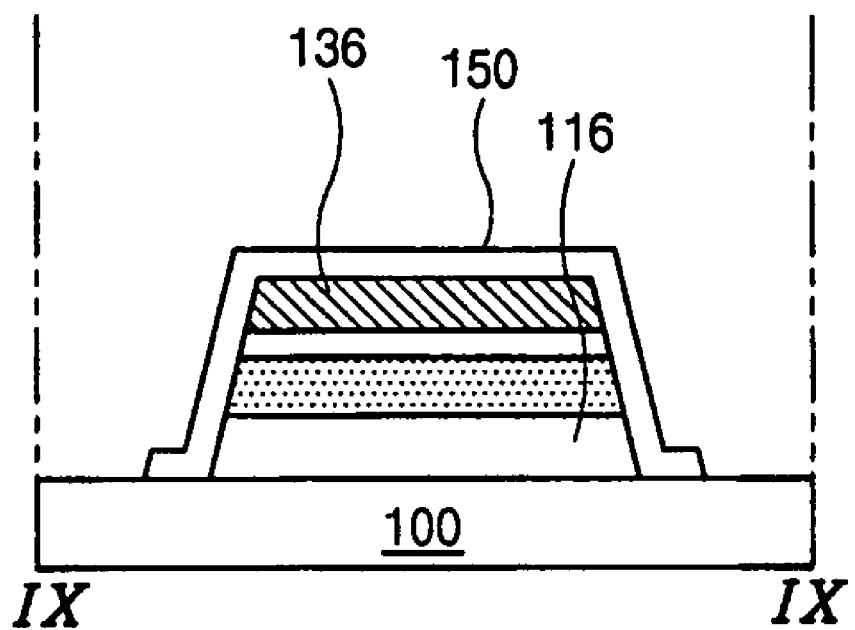

Then, as illustrated in FIGS. 7H, 8H and 9H, the gate pad terminal 148 and the data pad terminal 150 are exposed. The second passivation layer 154 may be used as an alignment layer by rubbing a surface of the second passivation layer 154.

Like this, the array substrate of the present invention is manufactured by using three masks. Therefore, the manufacturing method of the array substrate according to the present invention decreases the processes and the cost, and increases productivity.

It will be apparent to those skilled in the art that various modifications and variations can be made in the fabrication and application of the present invention without departing from the spirit or scope of the invention. Thus, it is intended that the present invention cover the modifications and variations of this invention provided they come within the scope of the appended claims and their equivalents.

What is claimed is:

1. A method of manufacturing an array substrate for a liquid crystal display device, comprising:
   depositing a first metal layer on a transparent substrate;
   patterning the first metal layer to form a gate line; a gate electrode; and a gate pad;
   forming a gate insulating layer over the transparent substrate and the patterned first metal layer;
   depositing a doped amorphous silicon layer and a second metal layer over the gate insulating layer;
   providing a photoresist pattern having first and second thicknesses over the second metal layer;
   selectively removing portions of the second metal layer according to the photoresist pattern;
   selectively removing portions of the amorphous silicon layer according to the photoresist pattern and selectively etching the gate insulating layer according to the photoresist pattern;
   removing a portion of the photoresist pattern having the first thickness;
   selectively etching the second metal layer exposed by removing the portion of the photoresist pattern having the first thickness;
   selectively etching the doped amorphous silicon layer exposed by selectively etching the second metal layer exposed by removing the photoresist pattern having the first thickness;
   removing the remaining photoresist pattern;
   depositing and patterning a transparent conductive material;
   forming a first passivation layer over an entire surface of the transparent substrate including the transparent conductive layer;
   forming a second passivation layer over selective portions of the first passivation layer by a printing method; and
   dry-etching the first passivation layer using the second passivation layer as an etching mask.

2. The method of claim 1, wherein the first metal layer is patterned by photolithography.

3. The method of claim 1, wherein the gate electrode extends from the gate line.

4. The method of claim 1, wherein the gate pad is at one end of the gate line.

5. The method of claim 1, wherein the first metal layer is a double layer structure.

6. The method of claim 5, wherein the double layer structure includes a first layer containing aluminum and second layer containing another metal.

7. The method of claim 6, wherein the another metal is molybdenum.

8. The method of claim 1, wherein the gate insulating layer is an inorganic material.

9. The method of claim 1, wherein the gate insulating layer is an organic material.

10. The method of claim 1, wherein the second metal layer is one of chromium, molybdenum, tungsten and tantalum.

11. The method of claim 10, wherein the second metal layer is molybdenum and the selectively etching the second metal layer and selectively etching the doped amorphous silicon layer are performed by dry etching.

12. The method of claim 11, wherein selectively etching the second metal layer and selectively etching the doped amorphous silicon layer are performed at the same time.

13. The method of claim 1, wherein the photoresist pattern is a positive type photoresist.

14. The method of claim 1, wherein the selectively removing portions of the second metal layer is performed by wet etching and selectively removing portions of the amorphous silicon layer and the doped amorphous silicon layer is performed by dry etching.

15. The method of claim 1, wherein the selectively removing portions of the gate insulating layer exposes portions of the transparent substrate and the gate pad.

16. The method of claim 1, wherein the transparent conductive material is Indium Tin Oxide.

17. The method of claim 1, wherein the transparent conductive material is Indium Zinc Oxide.

18. The method of claim 1, wherein the transparent conductive material is patterned by photolithography.

19. The method of claim 1, wherein the first passivation layer has a thickness of about 500 Å to about 1000 Å.

20. The method of claim 1, wherein the first passivation layer is an inorganic material.

21. The method of claim 1, wherein the first passivation layer is formed by depositing an inorganic material under the temperature of about 300 degrees Celsius.

22. The method of claim 1, further comprising crystallizing the amorphous silicon.

23. The method of claim 22, wherein the crystallizing the amorphous silicon is performed after the first passivation layer is deposited.

* * * * *